US011905303B2

(12) United States Patent
Qazvini et al.

(10) Patent No.: US 11,905,303 B2
(45) Date of Patent: Feb. 20, 2024

(54) METAL-ORGANIC FRAMEWORKS FOR GAS ADSORPTION

(71) Applicant: Massey University, Palmerston North (NZ)

(72) Inventors: Omid Taheri Qazvini, Palmerston North (NZ); Shane Telfer, Palmerston North (NZ)

(73) Assignee: Massey University, Palmerston North (NZ)

( * ) Notice: Subject to any disclaimer, the term of this patent is extended or adjusted under 35 U.S.C. 154(b) by 131 days.

(21) Appl. No.: 17/416,583

(22) PCT Filed: Dec. 20, 2019

(86) PCT No.: PCT/NZ2019/050163
§ 371 (c)(1),
(2) Date: Jun. 21, 2021

(87) PCT Pub. No.: WO2020/130856
PCT Pub. Date: Jun. 25, 2020

(65) Prior Publication Data
US 2022/0056064 A1 Feb. 24, 2022

(30) Foreign Application Priority Data
Dec. 21, 2018 (AU) .................. 2018904882

(51) Int. Cl.
*C07F 15/06* (2006.01)
*B01D 53/04* (2006.01)
(Continued)

(52) U.S. Cl.
CPC .......... *C07F 15/065* (2013.01); *B01D 53/047* (2013.01); *B01D 53/0462* (2013.01);
(Continued)

(58) Field of Classification Search
CPC . C07F 15/065; B01D 53/0462; B01D 53/047; B01D 53/62; B01D 2253/204; B01D 2257/504; C01B 37/00
(Continued)

(56) References Cited

U.S. PATENT DOCUMENTS

| 7,799,120 | B2 | 9/2010 | Yaghi et al. |
| 2012/0172612 | A1 | 7/2012 | Yaghi et al. |
| 2017/0341055 | A1 | 11/2017 | Chen et al. |

FOREIGN PATENT DOCUMENTS

| CN | 106457120 B | 4/2021 |
| WO | 2013/059527 A1 | 4/2013 |

(Continued)

OTHER PUBLICATIONS

Abbasi et al., Decarbonization of fossil fuels as a strategy to control global warming, Renew. Sus. Energ. Rev., 15:1828-1834 (2011).
(Continued)

*Primary Examiner* — Anita Nassiri-Motlagh
(74) *Attorney, Agent, or Firm* — MARSHALL, GERSTEIN & BORUN LLP

(57) ABSTRACT

Disclosed are metal organic frameworks (MOFs) for adsorbing guest species, methods for the separation of gases using the MOFs, and systems comprising the MOFs. The MOFs comprise a plurality of secondary building units (SBUs), each SBU comprising a repeating unit of one metal cation connected to another metal cation via a first moiety of an organic linker; a layer of connected adjacent SBUs in which a second moiety of the linker in a first SBU is connected to a metal cation of an adjacent SBU, and wherein adjacent layers are connected to each other via linker-to-linker bonding interactions.

13 Claims, 25 Drawing Sheets

(51) Int. Cl.
B01D 53/62 (2006.01)
C01B 37/00 (2006.01)
B01D 53/047 (2006.01)

(52) U.S. Cl.
CPC ............... B01D 53/62 (2013.01); C01B 37/00 (2013.01); *B01D 2253/204* (2013.01); *B01D 2257/504* (2013.01)

(58) Field of Classification Search
USPC .......................................................... 423/220
See application file for complete search history.

(56) References Cited

FOREIGN PATENT DOCUMENTS

WO WO-2015/164543 A1 10/2015
WO 2017/087422 A1 5/2017

OTHER PUBLICATIONS

Czepirski et al., Virial-type thermal equation of gas-solid adsorption, J. Chem. Eng. Sci., 44(4):797-801 (1989).
Dolomanov et al., OLEX2: a complete structure solution, refinement and analysis program, J Appl. Crystallogr., 42:339-341 (2009).
Hou et al., A rod packing microporous metal-organic framework: unprecedented ukv topology, high sorption selectivity and affinity for CO2, Chem. Commun., 47:5464-5466 (2011).
International Application No. PCT/NZ2019/050163, International Preliminary Report on Patentability, dated Jul. 1, 2021.
International Application No. PCT/NZ2019/050163, International Search Report and Written Opinion, dated Mar. 2, 2020.
Li et al., Porous metal-organic frameworks for gas storage and separation: Status and challenges, EnergyChem., 1(1):100006 (2019).
Lin et al., Exploration of porous metal-organic frameworks for gas separation and purification. Coord. Chem. Rev., 378(1):87-103 (2019).
McDonald et al., Capture of carbon dioxide from air and flue gas in the alkylamine-appended metal-organic framework mmen-Mg2(dobpdc), J. Am. Chem. Soc., 134:7056-7065 (2016).
Moreau et al., Unravelling exceptional acetylene and carbon dioxide adsorption within a tetra-amide functionalized metal-organic framework, Nat. Commun., 8:14085 (2017).
Myers et al., Thermodynamics of mixed-gas adsorption, AICHE J., 11:121-127 (1965).
Nugent et al., Porous materials with optimal adsorption thermodynamics and kinetics for CO2 separation, Nature, 495:80-84 (2013).
Oschatz et al., A search for selectivity to enable CO2 capture with porous adsorbents, Energ. Environ. Sci., 11:57-70 (2018).
Qazvini et al., A Robust ethane-trapping metal-organic framework with a high capacity for ethylene purification, J. Am. Chem. Soc., 141(12):5014-5020 (2019).
Qazvini et al., Multipurpose metal-organic framework for the adsorption of acetylene: ethylene purification and carbon dioxide removal, Chem. Mater., 31(13):4919-4926 (2019).
Rochelle, Amine scrubbing for CO2 capture, Science, 325:1652-1654 (Z009).
Rufford et al., The removal of CO2 and NZ from natural gas: A review of conventional and emerging process technologies, J. Petrol. Sci. Eng., 94:123-154 (2012).
Schoedel et al., Structures of metal-organic frameworks with rod secondary building units, Chem. Rev., 116(19):12466-12535 (2016).
Scott et al., Crystal engineering of a family of hybrid ultramicroporous materials based upon interpenetration and dichromate linkers, Chem. Sci., 7:5470-5476 (2016).
Sheldrick, A short history of SHELX, Acta Cryst. A, 64:112-22 (2008).
Simon et al., pyIAST: Ideal adsorbed solution theory (IAST) Python package, Comput. Phys. Commun., 200:364-380 (2016).
Tang et al., Two cobalt(II) 5-aminoisophthalate complexes and their stable supramolecular microporous frameworks, Inorg. Chem., 45(16):6276-81 (2006).
Tian et al., Four new Mn(II) inorganic-organic hybrid frameworks with diverse inorganic magnetic chain's sequences: syntheses, structures, magnetic, NLO, and dielectric properties, Inorg Chem., 54(6):2560-71 (2015).
Walton et al., Applicability of the BET method for determining surface areas of microporous metal-organic frameworks, J. Am. Chem. Soc., 129(27):8552-8558 (2007).
Yaghi et al., Reticular synthesis and the design of new materials, Nature, 423:705-714 (2003).
Yu et al., A review of CO2 capture by absorption and adsorption, Aerosol Air Qual. Res., 12:745-769 (2012).
Belmabkhout et al. "Low concentration $CO_2$ capture using physical adsorbents: are metal-organic frameworks becoming the new benchmark materials?", Chemical Engineering Journal, vol. 296, 2016, p. 386-397.
Saha et al. "Adsorption of $CO_2$, $CH_4$, $N_2O$, and $N_2$ on MOF-5, MOF-177, and Zeolite 5A" Environ. Sci. Technol., vol. 44, 2010, pp. 1820-1826.

METAL-ORGANIC FRAMEWORKS FOR GAS ADSORPTION

TECHNICAL FIELD

The present invention relates to porous materials for adsorbing guest species, and more specifically relates to metal-organic frameworks for adsorbing carbon dioxide.

BACKGROUND

Chemical separation processes consume vast quantities of energy. Economical and practical pathways to alleviating this burden are required. This is especially relevant to the capture of carbon dioxide. The release of carbon dioxide into the atmosphere underlies the greenhouse effect and subsequent temperature increases. There is a pressing need to mitigate $CO_2$ emissions, which can be achieved using a multifaceted approach involving an overall reduction in energy intensity coupled to the uptake of carbon-free fuels and enhanced $CO_2$ sequestration techniques. For example, fossil fuels can be decarbonized by trapping carbon dioxide from syngas prior to use, and emitted $CO_2$ can be captured at point sources where its concentration is high.[1] carbon dioxide must be removed from gas streams in many other situations, for example from natural gas and biogas, and to purify valuable hydrocarbons prior to polymerization or chemical derivatization. All of these processes rely on the selective capture of carbon dioxide over other gases. The established technology for trapping carbon dioxide involves chemical reactions with absorbents, typically amines, in solution.[2] This incurs multiple drawbacks, including high energy penalties during regeneration, losses due to degradation and evaporation, and the corrosion of hardware and pipelines.[3]

Reducing carbon dioxide is also important in industrial processes. For example, reducing levels of carbon dioxide in natural gas facilitates its transportation and prevents the corrosion of equipment and pipelines. Also, carbon dioxide in other gases or gas mixtures (such as acetylene, ethylene and ethane streams) may need to be removed before they can be used as feedstocks for the production of fine chemicals, fuels and polymers. Further, carbon dioxide needs to be scrubbed from closed atmospheres such as spacecraft and submarines.

The adsorption of carbon dioxide in nanoporous materials is an attractive alternative solution to chemisorption.[4] The weak, noncovalent bonding interactions that underlie physisorption rely on accessible pores that are structured on the molecular scale. They lower the energy requirements for driving off the trapped $CO_2$ to deliver materials that are sustainable and recyclable. Effective physisorbents combine high uptake, rapid guest diffusion, and long-term stability with selectivity for $CO_2$ over competing gases at relevant concentrations.

In this context, metal-organic frameworks (MOFs) have risen to prominence.[5,6] MOFs comprise a regular network of metal ions or clusters and organic linkers. MOFs may be porous, allowing the adsorbance of small molecules to occupy the pores of MOFs. They have regular repeating extended structures comprising notional 'secondary building unit' (SBU) subunits.[7] SBUs can be discrete metal or metal-ligand clusters or can be repeating metal or metal-ligand chains (sometimes referred to as infinite SBUs or SBU rods).[8] MOFs are considered to have significant potential in the capture, storage, separation and delivery of small molecules.

Unlike traditional porous materials (such as zeolites, silica, and activated carbons), the designer is able to have fine control over the structures, pore size, and functionalities of MOFs. Suitable porous materials for separations are those with judiciously designed pore sizes and geometries which are able to adsorb specific types of molecules while completely excluding others. In addition to pore geometry, MOFs may be designed to selectively adsorb particular gases based on other characteristics, such as functional groups and particular electrostatic characteristics (e.g. polarizability and polarity) within the pore.

Despite advances in the field, challenges remain in identifying MOF adsorbents that combine a good separation performance with the other requisite characteristics including long term stability, low cost, rapid guest diffusion, and ease of manufacture.

It is an object of the present invention to provide a porous material, method, and/or system which addresses at least one of the foregoing needs or problems, or at least provides the public with a useful choice.

SUMMARY OF THE INVENTION

As will be described in more detail herein, there is provided a porous metal organic framework (MOF) comprising a plurality of metal ions, and a plurality of organic linkers. There are further provided methods for the separation of a first species from a gases mixture comprising the first species, the method comprising contacting the gases mixture with a sorbent comprising a porous metal organic framework (MOF). There are further provided systems for separating a first species from a flow of a fluid mixture comprising the first species, comprising a chamber, an inlet attached to the chamber, the inlet being adapted to direct the fluid mixture into the chamber and a sorbent comprising a porous metal organic framework (MOF) positioned within the chamber.

In one aspect, there is provided a porous metal organic framework (MOF) comprising a plurality of secondary building units (SBUs), each SBU comprising a repeating unit of a metal cation linked to adjacent metal cations via a first moiety of an organic linker, wherein a layer of connected adjacent SBUs is formed by coordination of a second moiety of the organic linker compound in a first SBU with a metal cation of an adjacent SBU, and wherein a 3-dimensional network of SBUs is formed by linker-to-linker bonding interactions between adjacent layers, and wherein the MOF adsorbs a guest species into its pores from a gas mixture comprising the guest species.

The linker comprises a first moiety comprising two donor atoms for bridging metal ions to form a 1-dimensional SBU, a second moiety comprising a donor atom for coordinating to a metal ion in an adjacent 1-dimensional SBU to form a 2-dimensional layer, and an H-bonding moiety for bonding with an organic linker in an adjacent layer, so as to form a 3-dimensional structure.

The two donor atoms of the first moiety are preferably independently selected from oxygen, nitrogen and sulfur atoms. More preferably the donor atoms are oxygen atoms. The two donor atoms may be part of the same functional group (e.g. a bidentate functional group) such as a carboxylic acid, amidine or amide, or the two donor atoms may be part of separate functional groups such as two separate carbonyl or hydroxyl groups.

The donor atom of the second moiety may be an oxygen, nitrogen or sulfur atom. The donor atom may be part of a functional group, for example carboxyl, hydroxyl, amino, or thiol.

The H-bonding moiety includes functional groups that can participate in linker-to-linker bonding interactions. The H-bonding moiety preferably bonds with H-bonding moieties of other linkers. In an example, the H-bonding moiety comprises a functional group that can participate in hydrogen bonding, such as hydroxyl, amino, carboxylic acid, amidine, and amide. Preferably, the H-bonding functional group is a carboxylic acid.

The first moiety, second moiety and H-bonding moiety are connected to an organic core portion of the linker. In an example, the core portion is an aryl, heteroaryl, cycloalkyl or heterocycloalkyl group. Examples of preferred core portions include phenyl, furanyl, pyridyl, pyrazyl, pyrimidyl, biphenyl, naphthyl, bipyridyl and quinolinyl groups. A preferred core portion is a six-membered aryl or heteroaryl. A specific example of the core portion is a phenyl group.

In one example, the linkers comprise isophthalic acid or anions thereof (e.g. isophthalates) substituted with another moiety containing a donor atom capable of coordinating to a metal ion, in particular where the moiety is substituted on the isophthalate phenyl. In one example, the linkers comprise a phenyl core meta-substituted with two moieties comprising carboxyl groups, and further substituted with another moiety containing a donor atom for coordination to a metal cation, wherein the moiety may comprise functional groups selected from amino, hydroxyl and thiol. In other words, in this example, the linkers comprise isophthalic acid or isophthalate further substituted with a moiety containing a donor atom for coordination to a metal cation.

In a further aspect, there is provided a porous metal organic framework (MOF) comprising a plurality of secondary building units (SBUs), each SBU comprising a repeating unit of a metal cation linked to adjacent metal cations via the first moiety; a layer of connected adjacent SBUs in which SBUs are connected by the coordination of the second moiety in a first SBU to a metal cation of an adjacent SBU; and wherein adjacent layers are connected to each other via linker-to-linker bonding interactions; and wherein the MOF adsorbs a first species into its pores from a gas mixture comprising the first species.

In a further aspect, there is provided a method for the separation of a first species from a mixture comprising the first species, the method comprising contacting the mixture with a sorbent comprising a metal organic framework (MOF) wherein the MOF comprises a metal cation and an organic linker.

The linker may have the structure of Formula (I), or a salt or anion thereof:

(I)

A is a first moiety, and is selected from —COOR$^1$, —CONR$^1_2$, —C(NR$^1$)(NR$^1_2$), —NO$_2$, —OC(O)NR$^1_2$, —OC(O)OR$^1$, —OC(O)R$^1$, —N(R$^1$)C(O)OR$^1$, —N(R$^1$)C(O)R$^1$, —R$^2$CO$_2$R$^1$, —R$^2$C(NR$^1$)(NR$^1_2$), —R$^2$CONR$^1_2$, —R$^2$NO$_2$, —R$^2$OC(O)NR$^1_2$, —R$^2$OC(O)OR$^1$, —R$^2$OC(O)R$^1$, —R$^2$NR$^1$C(O)OR$^1$, —R$^2$N(R$^1$)C(O)R$^1$, —SO$_3$R$^1$, —R$^2$SO$_3$R$^1$, —R$^2$OC(S)NR$^1_2$, —R$^2$SC(O)NR$^1_2$, —SO$_2$R$^1$, —R$^2$SO$_2$R$^1$, —R$^2$(OR$^1$)$_2$, —R$^2$(OR$^1$)(COOR$^1$), —R$^2$(OR$^1$)(NR$^1_2$), —R$^2$(OR$^1$)(SR$^1$), —R$^2$(COOR$^1$)$_2$, —R$^2$(NR$^1_2$)(COOR$^1$), —R$^2$(SR$^1$)(COOR$^1$), —R$^2$(SR$^1$)$_2$, —R$^2$(NR$^1_2$)(SR$^1$), —R$^2$(NR$^1_2$)$_2$, —R$^2$(O)$_2$, —R$^2$(OR$^1$)(O), —R$^2$(O)(COOR$^1$), —R$^2$(O)(NR$^1_2$), —R$^2$(O)(SR$^1$). In an example, A is selected from —COOR$^1$, —CONR$^1_2$, —C(NR$^1$)(NR$^1_2$), —NO$_2$, —OC(O)NR$^1_2$, —OC(O)OR$^1$, —OC(O)R$^1$, —N(R$^1$)C(O)OR$^1$, —N(R$^1$)C(O)R$^1$, —R$^2$CO$_2$R$^1$, —R$^2$C(NR$^1$)(NR$^1_2$), —R$^2$CONR$^1_2$, —R$^2$NO$_2$, —R$^2$OC(O)NR$^1_2$, —R$^2$OC(O)OR$^1$, —R$^2$OC(O)R$^1$, —R$^2$NR$^1$C(O)OR$^1$, —R$^2$N(R$^1$)C(O)R$^1$. In a further example, A is selected from —COOR$^1$.

B is a second moiety, and is selected from —OR$^1$, —R$^2$OR$^1$, —NR$^1_2$, —R$^2$NR$^1_2$, —SR$^1$, —R$^2$SR$^1$, —COOR$^1$, —R$^2$CO$_2$R$^1$, —CONR$^1_2$, —R$^2$CONR$^1_2$. In an example, B is selected from —OR$^1$, —R$^2$OR$^1$, —NR$^1_2$, —R$^2$NR$^1_2$, —SR$^1$, —R$^2$SR$^1$. In another example, B is selected from —NR$^1_2$.

C is selected from —OR$^1$, —R$^2$OR$^1$, —NR$^1_2$, —R$^2$NR$^1_2$, —COOR$^1$, —CONR$^1_2$, —C(NR$^1$)(NR$^1_2$), —NO$_2$, —OC(O)NR$^1_2$, —OC(O)OR$^1$, —OC(O)R$^1$, —N(R$^1$)C(O)OR$^1$, —N(R$^1$)C(O)R$^1$, —R$^2$CO$_2$R$^1$, —R$^2$C(NR$^1$)(NR$^1_2$), —R$^2$CONR$^1_2$, —R$^2$NO$_2$, —R$^2$OC(O)NR$^1_2$, —R$^2$OC(O)OR$^1$, —R$^2$OC(O)R$^1$, —R$^2$NR$^1$C(O)OR$^1$, —R$^2$N(R$^1$)C(O)R$^1$, —SO$_3$R$^1$, —R$^2$SO$_3$R$^1$, —R$^2$OC(S)NR$^1_2$, —R$^2$SC(O)NR$^1_2$, —SO$_2$R$^1$, —R$^2$SO$_2$R$^1$, —R$^2$(OR$^1$)$_2$, —R$^2$(OR$^1$)(COOR$^1$), —R$^2$(OR$^1$)(NR$^1_2$), —R$^2$(OR$^1$)(SR$^1$), —R$^2$(COOR$^1$)$_2$, —R$^2$(NR$^1_2$)(COOR$^1$), —R$^2$(SR$^1$)(COOR$^1$), —R$^2$(SR$^1$)$_2$, —R$^2$(NR$^1_2$)(SR$^1$), —R$^2$(NR$^1_2$)$_2$, —R$^2$(O)$_2$, —R$^2$(OR$^1$)(O), —R$^2$(O)(COOR$^1$), —R$^2$(O)(NR$^1_2$), —R$^2$(O)(SR$^1$). In an example, C is selected from —COOR$^1$, —CONR$^1_2$, —C(NR$^1$)(NR$^1_2$), —NO$_2$, —OC(O)NR$^1_2$, —OC(O)OR$^1$, —OC(O)R$^1$, —N(R$^1$)C(O)OR$^1$, —N(R$^1$)C(O)R$^1$, —R$^2$CO$_2$R$^1$, —R$^2$C(NR$^1$)(NR$^1_2$), —R$^2$CONR$^1_2$, —R$^2$NO$_2$, —R$^2$OC(O)NR$^1_2$, —R$^2$OC(O)OR$^1$, —R$^2$OC(O)R$^1$, —R$^2$NR$^1$C(O)OR$^1$, —R$^2$N(R$^1$)C(O)R$^1$. In a further example, C is selected from —COOR$^1$.

R$^1$ is independently selected from hydrogen, alkyl, cycloalkyl, heterocycloalkyl, aryl, aralkyl, heteroaryl. In an example, R$^1$ is independently selected from hydrogen and C1-4 alkyl. In another example, R$^1$ is independently selected from hydrogen and methyl. In another example, R$^1$ is selected from hydrogen.

R$^1$ is optionally substituted with one or more of alkyl, halogen, haloalkyl, amino, alkylamino, alkoxy, hydroxyl, alkylhydroxyl, thiol, alkylthiol, cyano and nitro. In an example, R$^1$ is optionally substituted with one or more of C1-4 alkyl, C1-4alkylamino, halogen, C1-4alkoxy, hydroxyl, C1-4alkylhydroxyl, thiol, C1-4 alkylthiol.

R$^2$ is a diradical independently selected from alkyl, alkenyl, alkynyl, cycloalkyl, heterocycloalkyl, alkyoxy, aryl, aralkyl, and heteroaryl. In an example, R$^2$ is a diradical independently selected from C1-4 alkyl, C1-4alkylamino, C1-4alkoxy, C1-4alkylhydroxyl.

R$^2$ is optionally substituted with one or more of alkyl, halogen, haloalkyl, amino, alkylamino, alkoxy, hydroxyl, alkylhydroxy, thiol, alkylthiol, cyano and nitro. In an example, R$^2$ is optionally substituted with one or more of C1-4 alkyl, C1-4alkylamino, halogen, C1-4alkoxy, hydroxyl, C1-4alkylhydroxyl, thiol, C1-4 alkylthiol.

A, B and C are bonded to core Q, wherein Q is selected from the group consisting of aryl, heteroaryl, heterocycloalkyl and cycloalkyl groups. In an example, Q is selected from a 5- or 6-membered aryl, heteroaryl, heterocycloalkyl and cycloalkyl groups. In another example, Q is selected from a 6-membered aryl, heteroaryl, heterocycloalkyl and cycloalkyl groups. In another example, Q is selected form 6-membered aryl or heteroaryl. In another example, Q is phenyl.

Q is optionally further substituted with one or more substituents selected from hydroxy, halogen, haloalkyl, haloalkoxy, amino, nitro, cyano, aminoalkyl, dialkylamino, aminoalkenyl, alkyloxy, alkenyloxy, alkyl, alkenyl, alkynyl, aryl, aralkyl, heteroaryl, heterocycloalkyl, cycloalkyl, carboxy, carboxyalkyl, carboxyalkenyl, thiol, alkylthio, arylthio, aralkylthio, nitro or cyano, each of which may be optionally further substituted. In an example, Q is optionally further substituted with one or more substituents selected from C1-4alkyl, C1-4alkylamino, halogen, C1-4alkoxy, hydroxyl, C1-4alkylhydroxyl, thiol, C1-4 alkylthiol.

In an example, the first species is selected from carbon dioxide, carbon disulfide, nitrous oxide, water, hydrogen sulfide, hydrogen cyanide, functionalised C1-3 hydrocarbons, and a combination thereof. In an example, functionalised C1-3 hydrocarbons are selected from C1-C3 alcohols, C1-C3 aldehydes, C1-C3 nitriles, C1-C3 alkyl halogens. In another example, the first species is carbon dioxide.

In some embodiments, where the core is a six-membered aryl or heteroaryl group, the first moiety, second moiety and H-bonding moiety have a 1,3,5 or 2,4,6 substitution pattern on the core.

In an example, the organic linker has the structure of Formula (II):

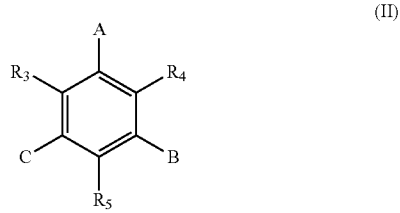

(II)

wherein: A, B and C are as defined for Formula (I); and $R^3$, $R^4$ and $R^5$ are independently selected from hydrogen, hydroxy, halogen, haloalkyl, haloalkoxy, amino, nitro, cyano, aminoalkyl, dialkylamino, aminoalkenyl, alkyloxy, alkenyloxy, alkyl, alkenyl, alkynyl, aryl, aralkyl, heteroaryl, heterocycloalkyl, cycloalkyl, carboxy, carboxyalkyl, carboxyalkenyl, thiol, alkylthio, arylthio, aralkylthio, nitro or cyano, each of which may be optionally further substituted. In an example, $R^3$, $R^4$ and $R^5$ are independently selected from hydrogen, C1-4alkyl, C1-4alkylamino, halogen, C1-4haloalkyl, C1-4haloalkoxy, amino, nitro, C1-4alkoxy, hydroxyl, C1-4alkylhydroxyl, thiol, C1-4alkylthiol.

In an example, A and C are —COOH or anions thereof, and B is —NH$_2$. In an example, the MOF has a formula of [M(Haip)$_2$]$_n$, where M is the metal cation, Haip⁻ is an anion of 5-amino-isophthalate (i.e. [C$_6$H$_3$(COOH)(COO)(NH$_2$)]⁻), and wherein n may be 1 to an integer greater than 0, (e.g. 100,000,000). In a more particular example, the MOF has a formula of [Co(Haip)$_2$]$_n$, or [Mn(Haip)$_2$]$_n$, or [Ni(Haip)$_2$]$_n$.

In an example, the SBU has a formula of [ML$_2$]$_n$, wherein M is the metal cation, L is the organic linker and n is an integer greater than 0.

In an example, the SBU comprises a metal cation linked to an adjacent metal cation by two organic linkers.

In an example, the linker to linker bonding interactions are non-covalent, and may be hydrogen bonding interactions. In an example, the linker to linker bonding interactions are between group C of the linker (i.e. group C-group C interactions). In one example, the linker to linker bonding interactions comprise carboxyl-carboxyl bonding interactions.

In an example, the metal is selected from Li⁺, Na⁺, K⁺, Rb⁺, Cs⁺, Be²⁺, Mg²⁺, Ca²⁺, Sr²⁺, Ba²⁺, Sc³⁺, Sc²⁺, Sc⁺, Y³⁺, Y²⁺, Y⁺, Ti⁴⁺, Ti³⁺, Ti²⁺, Zr⁴⁺, Zr³⁺, Zr²⁺, Hf⁴⁺, Hf³⁺, V⁵⁺, V⁴⁺, V³⁺, V²⁺, Nb⁵⁺, Nb⁴⁺, Nb³⁺, Nb²⁺, Ta⁵⁺, Ta⁴⁺, Ta³⁺, Ta²⁺, Cr⁶⁺, Cr⁵⁺, Cr⁴⁺, Cr³⁺, Cr²⁺, Cr⁺, Cr, Mo⁶⁺, Mo⁵⁺, Mo⁴⁺, Mo³⁺, Mo²⁺, Mo⁺, Mo, W⁶⁺, W⁵⁺, W⁴⁺, W³⁺, W²⁺, W⁺, W, Mn⁷⁺, Mn⁶⁺, Mn⁵⁺, Mn⁴⁺, Mn³⁺, Mn²⁺, Mn⁺, Re⁷⁺, Re⁶⁺, Re⁵⁺, Re⁴⁺, Re³⁺, Re²⁺, Re⁺, Re, Fe⁶⁺, Fe⁴⁺, Fe³⁺, Fe²⁺, Fe⁺, Fe, Ru⁸⁺, Ru⁷⁺, Ru⁶⁺, Ru⁴⁺, Ru³⁺, Ru²⁺, Os⁸⁺, Os⁷⁺, Os⁶⁺, Os⁵⁺, Os⁴⁺, Os³⁺, Os²⁺, Os⁺, Os, Co⁵⁺, Co⁴⁺, Co³⁺, Co²⁺, Co⁺, Rh⁶⁺, Rh⁵⁺, Rh⁴⁺, Rh³⁺, Rh²⁺, Rh⁺, Ir⁶⁺, Ir⁵⁺, Ir⁴⁺, Ir³⁺, Ir²⁺, Ir, Ni³⁺, Ni²⁺, Ni⁺, Ni, Pd⁶⁺, Pd⁴⁺, Pd²⁺, Pd⁺, Pd, Pt⁶⁺, Pt⁵⁺, Pt⁴⁺, Pt³⁺, Pt²⁺, Pt⁺, Cu⁴⁺, Cu³⁺, Cu²⁺, Cu⁺, Ag³⁺, Ag²⁺, Ag⁺, Au⁵⁺, Au⁴⁺, Au³⁺, Au²⁺, Au⁺, Zn²⁺, Zn⁺, Zn, Cd²⁺, Cd⁺, He⁺, Hg²⁺, Hg⁺, B³⁺, B²⁺, B⁺, Al³⁺, Al²⁺, Al⁺, Ga³⁺, Ga²⁺, Ga⁺, In³⁺, In²⁺, In¹⁺, Ti³⁺, Ti⁺, Sr⁺, Si³⁺, Si²⁺, Si⁺, Ge⁴⁺, Ge³⁺, Ge²⁺, Ge⁺, Ge, Sn⁴⁺, Sn²⁺, Pb⁴⁺, Pb²⁺, As⁵⁺, As³⁺, As²⁺, As⁺, Sb⁵⁺, Sb³⁺, Bi⁵⁺, Bi³⁺, Te⁶⁺, Te⁵⁺, Te⁴⁺, Te²⁺, La³⁺, La²⁺, Ce⁴⁺, Ce³⁺, Ce²⁺, Pr⁴⁺, Pr³⁺, Pr²⁺, Nd³⁺, Nd²⁺, Sm³⁺, Sm²⁺, Eu³⁺, Eu²⁺, Gd³⁺, Gd²⁺, Gd⁺, Tb⁴⁺, Tb³⁺, Tb²⁺, Tb⁺, db³⁺, db²⁺, Ho³⁺, Er³⁺, Tm⁴⁺, Tm³⁺, Tm²⁺, Yb³⁺, Yb²⁺, Lu³⁺, and any combination thereof.

More preferably, the metal cation is selected from the group consisting of Mg²⁺, Ca²⁺, Sr²⁺, Ba²⁺, Sc³⁺, Sc²⁺, Y³⁺, Y²⁺, Ti³⁺, Ti²⁺, V³⁺, V²⁺, Nb³⁺, Nb²⁺, Cr³⁺, Cr²⁺, Mo³⁺, Mo²⁺, Mn³⁺, Mn²⁺, Fe³⁺, Fe²⁺, Ru³⁺, Ru²⁺, Co³⁺, Co²⁺, Rh³⁺, Rh²⁺, Ni²⁺, Pd²⁺, Cu²⁺, Zn²⁺, Cd²⁺, B³⁺, Al³⁺, Ga³⁺, In³⁺, Ti³⁺, Si²⁺, Ge²⁺, Sn²⁺, As³⁺, As²⁺, and any combination thereof.

In an example, the metal is M²⁺.

In an example, the metal cation has an octahedral coordination geometry.

In an example, the gas mixture further comprises air, water (H$_2$O), hydrogen sulfide (H$_2$S), oxygen (O$_2$), nitrogen (N$_2$), hydrogen (H$_2$), helium, neon, argon, krypton, xenon, radon, ozone (O$_3$), carbon monoxide (CO), nitric oxide (NO), and nitrogen dioxide (NO$_2$), functionalised and non-functionalised hydrocarbons, or a combination thereof, wherein the hydrocarbons include methane (CH$_4$), C2 and C3 hydrocarbons, including ethane, propane, butane, ethene, propene, 1-butene, 2-butene, ethyne (acetylene), propyne, 1-butyne and 2-butyne, and substituted analogues or derivatives thereof, and combinations thereof.

In an example, the gas mixture comprises humidified gases, such as gases comprising water, including water vapour.

In an example, the gas mixture comprises anaesthetic gas, refrigerant or coolant gas, air, natural gas, liquefied petroleum gas, coal seam gas, syngas.

In an example, the first species is an impurity or trace impurity and the gas mixture is a commercial, industrial or medical gas or gas mixtures. For example, the gas mixture is oxygen, medical or breathing air, nitrous oxide, nitrogen, fuel gas, coal gas, syngas, biogas, hydrogen, blast furnace gas.

In another example, the gas mixture is atmospheric or ambient air.

In an example, where the gases mixture comprises a first species and non-functionalised hydrocarbons, the first species may be selected from carbon dioxide, carbon disulfide, nitrous oxide, water, hydrogen sulfide, hydrogen cyanide, functionalised C1-3 hydrocarbons, and combinations thereof.

In an example, where the first species is carbon dioxide, the gas mixture comprises air, water ($H_2O$), hydrogen sulfide ($H_2S$), oxygen ($O_2$), nitrogen ($N_2$), hydrogen ($H_2$), helium, neon, argon, krypton, xenon, radon, ozone ($O_3$), carbon monoxide (CO), nitric oxide (NO), and nitrogen dioxide ($NO_2$), functionalised hydrocarbons, non-functionalised hydrocarbons, or a combination thereof.

In an example, the sorbent further comprises a material selected from polymeric materials, membranes, ceramics, resins, biomolecules, clays, carbon (e.g. activated carbon), inorganic oxides, metal salts, and a combination thereof.

In an example, the sorbent is provided as a membrane.

In an example, the MOF has a $CO_2$ uptake of greater than 10 cc $CO_2$ per gram of guest-free MOF (at 1 bar and 293K), preferably greater than 20, preferably greater than 30, preferably greater than 40, preferably greater than 45.

In an example, the MOF has a $CO_2$/hydrocarbon uptake ratio (equimolar mixture, at 1 bar and 293 K) of greater than 8, greater than 10, greater than 12.

In an example, the MOF has a $CO_2$/C2 uptake ratio of greater than 8, greater than 10, greater than 12.

In an example, the MOF has a $CO_2/C_2H_2$ uptake ratio (equimolar mixture, at 1 bar and 293 K) of greater than 8, greater than 10, greater than 12. The MOF can have a $CO_2/C_2H_2$ uptake ratio of greater than 8, greater than 10, greater than 12.

In an example, the MOF has $CO_2/CH_4$ uptake ratio (equimolar mixture, at 1 bar and 293 K) of greater than 8, greater than 10, greater than 12, greater than 14, greater than 16, greater than 18, greater than 20, greater than 25, greater than 30.

In an example, the MOF has a $CO_2/N_2$ uptake ratio (equimolar mixture, at 1 bar and 293 K) of greater than 8, greater than 10, greater than 12, greater than 14, greater than 16, greater than 18, greater than 20, greater than 25, greater than 30.

In an example, the MOF has a $CO_2$/C2 IAST selectivity (50/50 ratio at 1 bar and 293 K) of at least 30, at least 50, at least 100, greater than 150, greater than 200, greater than 250, greater than 300, greater than 350, greater than 400, greater than 450, greater than 500, greater than 550.

In an example, the MOF has a $CO_2/C_2H_2$ IAST selectivity (50/50 ratio at 1 bar and 293 K) of at least 30, at least 50, at least 100, greater than 150, greater than 200, greater than 250, greater than 300, greater than 350, greater than 400, greater than 450, greater than 500, greater than 550.

In an example, the MOF has a $CO_2/CH_4$ IAST selectivity (50/50 ratio at 1 bar and 293 K) of at least 400, greater than 500, greater than 1000, greater than 2000, greater than 3000, greater than 3500, greater than 4000, greater than 4500, greater than 5000.

In an example, the MOF has a $CO_2/H_2$ IAST selectivity (20/80 ratio at 1 bar and 293 K) of at least 300, greater than 500, greater than 1000, greater than 2000, greater than 3000, greater than 3500, greater than 4000, greater than 4500, greater than 5000, greater than 6000, greater than 7000, greater than 8000, greater than 9000.

The MOF can retain its selectivity towards carbon dioxide for a commercially and industrially useful amount time when heated. The MOF is preferably stable under a nitrogen atmosphere at temperatures of up to 200° C., more preferably 250° C., more preferably 300° C., more preferably 350° C., most preferably 400° C. In use, and/or in ambient conditions, the MOF is selective for carbon dioxide at a range of temperatures. For example, the MOF can be selective for carbon dioxide at ambient temperatures, at temperatures over 50° C., over 100° C., or over 150° C.

The MOF is preferably selective for adsorbing carbon dioxide from a gas mixture where the concentration (or partial pressure) of carbon dioxide in the gas mixture is low. Preferably, the MOF is selective for adsorbing carbon dioxide from a gas mixture where the carbon dioxide is 50% or less, 40% or less, 30% or less, 20% or less, 10% or less, 5% or less, 1% or less, 0.1% or less, 0.01% or less, 0.001% or less, 0.0001% or less, 1000 ppm or less, 100 ppm or less, 10 ppm or less, or 1 ppm or less.

The MOF retains a stable structure at low and high gas pressures. For example, the MOF has a stable structure at a near-vacuum, and preferably at gas pressures of up to about 50 bar, 100 bar, 150 bar, 200 bar, 250 bar, 300 bar, 350 bar, 400 bar, 450 bar, 500 bar.

The MOF can be activated by heating and/or under reduced pressure, and due to its selectivity towards carbon dioxide over gases in the ambient environment (excluding, of course, ambient carbon dioxide) it can be stored under ambient conditions until required. After use in the presence of carbon dioxide, the MOF can be reactivated by desorbing carbon dioxide under vacuum and/or heating and/or purging with gas for re-use.

The MOF is preferably able to completely desorb the adsorbed guest species by the reduction of pressure and/or the increase in temperature (optionally in the presence of another gas). In one example, the MOF can be regenerated using temperature and/or pressure swings. In another example, the MOF can desorb the first species by heating (for example, to between about 20° C. and about 130° C.), or in vacuo, or by purging with a flow of dry air, or a combination of two or more of the aforementioned methods.

The MOF is preferably able to perform multiple adsorption/desorption cycles. Preferably, the MOF is able to substantially maintain its carbon dioxide uptake and complete desorption over at least 5 cycles, preferably more than 10 cycles, preferably more than 50 cycles and preferably more than 100, 200, 300, 400, or 500 cycles.

The MOF preferably retains its adsorption activity and selectivity towards the first species in the presence of air and/or water for a commercially and industrially useful amount of time. Preferably, the MOF is stable in humid air at room temperature (80% humidity at approx. 25° C.) for more than 1 week, more preferably more than 2 weeks, more preferably more than 1 month, more preferably more than 2 months, more preferably more than 3 months, more preferably more than 4 months, more preferably more than 5 months, and more preferably more than 6 months. More preferably, the ability of the MOF to capture the first species from gas mixtures is unaffected by the presence of water vapour. Preferably, the MOF is stable in the presence of bulk water, and preferably retains is selectivity and activity after contact with bulk water (including full immersion in water), wherein the contact with water can last for more than 2 days, 5 days, 10 days, or 15 days.

The MOF preferably retains its selectivity towards the first species, in the presence of toxic and/or corrosive gases such as (but not limited to) ammonia, hydrogen sulfide and sulfur dioxide.

In another example, the MOF can be deployed in combination with other components. For example, the MOF can be combined with a further component or components. These components may include materials such as, but not limited to, polymers, biomolecules, resins, ceramics, carbon (e.g. activated carbon) and inorganic oxides. The composite material may take the form, for example, of a pellet, membrane, sheet, or monolith. For example, the MOF may be combined with further components to form a membrane, such as gas separation membranes.

The MOF can be used to selectively adsorb the first species from a fluid or a fluid flow (including a liquid, a liquid flow, a gas and/or a gas flow). In particular, the MOF can be used to adsorb the first species from fluids comprising the first species in concentrations or partial pressures as described above. The MOF can be used in continuous streams of fluid, for example as a filter or bed through which the fluid flows, or can be added to batches of fluid.

The MOF can be used to separate the first species from a flow of a fluid mixture comprising a mixture of species. For example, the MOF may be included in an adsorption bed.

The fluid may be liquid, gas or supercritical fluid, and is preferably a gas or mixture of gases. The inlet fluid can comprise an amount of the first species. For example, the fluid may comprise a combination of hydrocarbon and the first species. As the fluid passes over the MOF, the the first species is adsorbed selectively. The fluid that exits the outlet is lower in carbon dioxide compared to the fluid that entered the inlet.

In one example, the MOF can be used to adsorb the first species from industrial, crude, unrefined or partially refined sources of hydrocarbons, such as natural gas, liquefied petroleum gas, coal seam gas, acetylene, methane, ethane and combinations thereof.

In another example, the MOF can be used to adsorb the first species e from exhaled air in rebreather devices.

In another example, the MOF can be used to adsorb the first species in closed or partially closed anaesthesia systems or respiratory devices, and/or to enhance the recovery of anaesthetic gases (e.g. isoflurane, sevoflurane, desflurane, cyclopropane and xenon).

In another example, the MOF can be deployed in the ambient environment to adsorb the first species from the atmosphere. The MOF can deployed in closed or sealed systems such as in commercial meeting rooms, residential apartments and hotel rooms, on board submarines, spacecraft or military bunkers, where the MOF can act as a carbon dioxide scrubber or scavenger.

Accordingly, there are provided methods of scavenging, sequestering, storing, or capturing a first species by contacting a gas or fluid mixture comprising the first species with the MOF. The gas or fluid mixture may alternatively include anesthetic gas, refrigerant or coolant gas, air, hydrogen gas, oxygen gas, or C2 gas (such as acetylene, ethene, ethane and mixtures thereof). For example, there is provided a method of removing the first species from a gases mixture comprising the first species, including exposing the MOF or a composite material containing the MOF to the gases mixture. The MOF may be used where the first species levels are relatively high, or only present in trace amounts (e.g. less than 1%). The MOF may be used in applications such as capturing carbon dioxide from industrial emissions, such as flue gas, biogas, and gas from geothermal vents.

The MOF can also be used to purify or decontaminate crude or unrefined fluid streams. For example, the MOF can be used to purify or decontaminate streams of hydrogen, oxygen, hydrocarbons such as natural gas, liquefied petroleum gas or coal seam gas.

As adsorption beds comprising the MOF of the present invention are shown herein to retain $CO_2$ while the Hz component is eluted immediately in a high purity stream, these materials can be deployed to remove $CO_2$ during the purification of syngas.

Similarly, as the presence of the heavier adsorbates such as $C_2H_6$ and $C_3H_8$ does not impede the $CO_2$ capture capabilities of MUF-16, the MOFs are particularly suited for the removal of $CO_2$ from both biogas and natural gas.[9] As further demonstrated herein, breakthrough measurements at higher pressure (9 bar) showed that $CO_2$ was cleanly removed from the gas stream, which indicates excellent applicability of the MOF to high-pressure processes, such as natural gas sweetening or industrial carbon dioxide capture.

The breakthrough apparatus shown in FIG. 25 and described in Example 5 demonstrates that the MOF can be included in a fixed bed adsorption column and used to separate carbon dioxide from a flow of a fluid mixture comprising a mixture of species. The fluid may be liquid, gas or supercritical fluid, and is preferably a gas or mixture of gases. The inlet fluid can comprise an amount of carbon dioxide. For example, the fluid may be a combination of hydrocarbon and carbon dioxide. As the fluid passes over the MOF, the carbon dioxide is adsorbed selectively. The fluid that exits the outlet is lower in carbon dioxide compared to the fluid that entered the inlet.

Accordingly, there is further provided a system for separating a first species from a mixture, comprising a chamber having an inlet adapted to direct the mixture into the chamber, and a sorbent comprising the metal organic framework (MOF) of the present invention positioned within the chamber.

In use, the mixture exiting the chamber has a reduced level of first species compared to the mixture entering the chamber.

The MOF may be included in or on a substrate, such as a material selected from polymeric materials, membranes, resins, biomolecules, clays, ceramics, carbon (e.g. activated carbon), inorganic oxides, and a combination thereof. The MOF or substrate may be part of an adsorption bed, such as a fixed bed. The system can include the MOF located in a chamber having an inlet and an outlet, wherein a gas mixture comprising carbon dioxide enters the chamber through the inlet, interacts with the MOF, and exits through the outlet. A temperature and/or pressure swing can be included, comprising a temperature controller configured to control the temperature of the MOF and/or a pressure controller configured to control the pressure of the gases flow path in which the MOF is located. The system may further include any one or more of a back pressure regulator, a mass flow controller, a mass flow meter, a heater, and a carrier gas source. The mixture may include any of the mixture components described herein.

One method for forming the MOF comprises the combination of metal and linker precursors in a solvent. In an example of this method, the precursor reagents include a metal salt and an organic compound which forms the organic linker of the MOF. In an example, the MOF is prepared by combination of the metal salt and organic compound with a protic solvent. The protic solvent can be selected from water, alcohols (e.g. methanol, ethanol, propanol) or a combination thereof. For example, the solvent can be a combination of methanol and water. The solvent is then heated then cooled to yield a solid MOF product. Preferably, the reaction conditions include a reaction time of less than 5 hours, more preferably less than 4 hours, more preferably less than 3 hours, more preferably less than 2 hours. Preferably the solvothermal conditions include temperatures less than 150° C., more preferably less than 130° C., more preferably less than 110° C., more preferably less than 100° C., more preferably less than 90 C. The method may be carried out under solvothermal conditions. Preferably, the solvothermal conditions include a closed reaction vessel and autogenous pressure. The MOF can be used in the form it is retrieved from its reaction vessel, i.e. in a crystalline or microcrystalline form as obtained from the solvothermal reaction, or can be further modified by, for example, by washing, solvent exchange, activation, or mechanical grinding of the reaction product. The MOF can be used in any particle size. Alternative methods envisioned by the inventors include mechanochemical methods of synthesis, melt synthesis and synthesis in a flow reactor.

While the MOF is preferably crystalline, the MOF may additionally comprise semicrystalline structure domains, or at least partially amorphous structure domains.

DEFINITIONS

Figure 1:
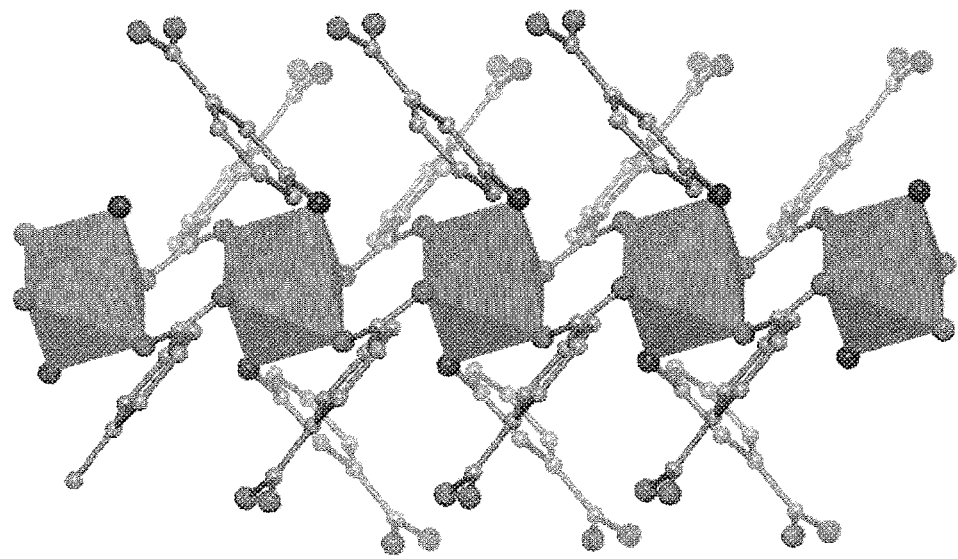
FIG. 1 shows a molecular model of the SBU of MUF-16, wherein the octahedra are Co(II) cations. One-dimensional cobalt(II) chains are connected by $\mu_2$-bridging carboxylate groups of the Haip ligands ($H_2$aip=5-aminoisophthalic acid), and nitrogen donor atoms from Haip ligands of adjacent SBUs coordinate at axial positions.

Unless specifically defined otherwise, all technical and scientific terms used herein shall be taken to have the same meaning as commonly understood by one of ordinary skill in the art (for example, in materials science and chemistry).

It is intended that reference to a range of numbers disclosed herein (e.g. 1 to 10) also incorporates reference to all related numbers within that range (e.g. 1, 1.1, 2, 3, 3.9, 4, 5, 6, 6.5, 7, 8, 9 and 10) and also any range of rational numbers within that range (for example 2 to 8, 1.5 to 5.5 and 3.1 to 4.7) and, therefore, all sub-ranges of all ranges expressly disclosed herein are expressly disclosed. These are only examples of what is specifically intended and all possible combinations of numerical values between the lowest value and the highest value enumerated are to be considered to be expressly stated in this application in a similar manner.

The term "and/or", e.g., "X and/or Y" shall be understood to mean either "X and Y" or "X or Y" and shall be taken to provide explicit support for both meanings or for either meaning.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Throughout this specification, unless specifically stated otherwise or the context requires otherwise, reference to a single step, composition of matter, group of steps or group of compositions of matter shall be taken to encompass one and a plurality (i.e. one or more) of those steps, compositions of matter, groups of steps or group of compositions of matter.

"Hydrogen" is intended to encompass isotopes of hydrogen, including deuterium.

The term "hydrocarbon" means a saturated or unsaturated organic compound comprising a linear, branched or cyclic carbon structure, which may be functionalised or non-functionalised. Examples of non-functionalised hydrocarbons include methane ($CH_4$), C2 and C3 hydrocarbons, including ethane, propane, butane, ethene, propene, 1-butene, 2-butene, ethyne (acetylene), propyne, 1-butyne and 2-butyne. Functionalised hydrocarbons are hydrocarbons that are substituted with one or more functional groups or heteroatoms. Examples of functionalised hydrocarbons include alcohols, aldehydes, amines, alkylhalides and alkylnitriles. The term "functionalised C1-3 hydrocarbon" means any functionalised hydrocarbon having up to three carbon atoms, and includes, for example, methanol, ethanol, propanol, formaldehyde, acetone, acetic acid, methyl bromide, methyl iodide, methylamine, ethylamine, hydrogen cyanide, cyanogen, and acetonitrile.

The term "alkyl" means any saturated non-functionalised hydrocarbon radical and is intended to include both straight-chain and branched-chain alkyl groups. Examples of alkyl groups include, but are not limited to, methyl, ethyl, n-propyl, iso-propyl, n-butyl, iso-butyl, sec-butyl, t-butyl, n-pentyl, 1,1-dimethylpropyl, 1,2-dimethylpropyl, 2,2-dimethylpropyl, 1-ethylpropyl, 2-ethylpropyl, n-hexyl, and 1-methyl-2-ethylpropyl. The term "C1-C6 alkyl" means any alkyl radical having up to 6 carbon atoms.

The term "alkenyl" means any non-functionalised hydrocarbon radical having at least one double bond, and is intended to include both straight- and branched-chain alkenyl groups. Examples of alkenyl groups include, but are not limited to, ethenyl, n-propenyl, iso-propenyl, n-butenyl, iso-butenyl, sec-butenyl, t-butenyl, n-pentenyl, 1,1-dimethylpropenyl, 1,2-dimethylpropenyl, 2,2-dimethylpropenyl, 1-ethylpropenyl, 2-ethylpropenyl, n-hexenyl, and 1-methyl-2-ethyl propenyl.

The term "alkynyl" means any non-functionalised hydrocarbon radical having at least one triple bond, and is intended to include both straight- and branched-chain alkynyl groups. Examples of alkynyl groups include, but are not limited to, ethynyl, n-propynyl, iso-propynyl, n-butynyl, iso-butynyl, sec-butynyl, t-butynyl, n-pentynyl, 1,1-dimethylpropynyl, 1,2-dimethylpropynyl, 2,2-dimethylpropynyl, 1-ethylpropynyl, 2-ethylpropynyl, n-hexynyl, and 1-methyl-2-ethylpropynyl.

The term "alkylene" means a diradical corresponding to an alkyl group. Examples of alkylene groups include, but are not limited to, methylene and ethylene.

The term "cycloalkyl" means a saturated or partially saturated non-aromatic carbocyclic group, having preferably from 3 to 8 ring carbon atoms. Examples of cycloalkyl groups include, but are not limited to, cyclopropyl, cyclobutyl, cyclopentyl, cyclohexyl, cycloheptyl, and cyclooctyl.

The term "heterocyclyl" means a cycloalkyl group where one or more of the ring carbon atoms is replaced with one or more heteroatoms, e.g. nitrogen, oxygen or sulfur. Examples of heterocyclyl groups include, but are not limited to, pyrrolidinyl, pyrrolinyl, pyrazolidinyl, aziridinyl, thiiranyl, 1,2-dithietanyl, morpholinyl, furanyl, pyranyl, thiophenyl, isoxazolyl, furazanyl, tetrahydrofuranyl, thietanyl, piperidinyl, azetidinyl, oxiranyl, epoxide, and thiacyclohexyl.

The term "alkoxy" means an alkyl group singular bonded to an oxygen atom. Examples of alkoxy groups include, but are not limited to, methoxy, ethoxy, propoxy, n-butoxy, iso-butoxy, sec-butoxy, and t-butoxy, The term "aryl" means an aromatic radical. Examples include monocyclic groups as well as fused groups such as bicyclic groups and tricyclic groups. Examples include, but are not limited to, phenyl, indenyl, 1-naphthyl, 2-naphthyl, azulenyl, heptalenyl, biphenyl, indacenyl, acenaphthyl, fluorenyl, phenalenyl, phenanthrenyl, anthracenyl, cyclopentacyclooctenyl, and benzocyclooctenyl.

The term "heteroaryl" means a heterocyclic aromatic (heteroaromatic) radical. Examples include monocyclic groups as well as fused groups such as bicyclic groups and tricyclic groups. Examples include, but are not limited to, pyridyl, pyrrolyl, pyridazinyl, pyrimidinyl, pyrazinyl, triazolyl, tetrazolyl, benzotriazolyl, pyrazolyl, imidazolyl, benzimidazolyl, indolyl, isoindolyl, indolizinyl, purinyl, indazolyl, furyl, pyranyl, benzofuryl, isobenzofuryl, thienyl, thiazolyl, isothiazolyl, benzothiazolyl, oxazolyl, and isoxazolyl.

The term "aralkyl" means an aryl group which is attached to an alkylene moiety, where aryl and alkylene are as defined above. Examples include benzyl group.

"IAST" means "ideal adsorbed solution theory", which can be used to predict mixed component adsorption isotherms from single component adsorption isotherms.[10]

DETAILED DESCRIPTION

The inventors have developed a MOF showing the surprising property of being a nanoporous adsorbent with selectivity for $CO_2$ over a broad range of other gases. It combines attractive non-covalent, physisorptive contacts between guest $CO_2$ molecules and the pore surface with rapid diffusion kinetics, robustness and recyclability. While known MOF adsorbents may show selectivity for $CO_2$ over one or two other gases, the breadth of selectivity exhibited by the MOFs of the present invention is an unusual and unexpected property.

1-Dimensional Chain

The MOF of the present invention comprises a regular extended structure made from the connection of repeating metal-linker units. The repeating units comprise metal cations connected via organic linkers. Each organic linker comprises a first moiety that coordinates to and connects adjacent metal ions to form a 1-dimensional chain, also referred to herein as a secondary building unit (SBU). The MOF comprises a plurality of secondary building units (SBUs), each SBU comprising a linear chain of repeating metal-linker units.

In an example, the SBU formula is $M(L)_2$, wherein M is a metal cation and L is the organic linker compound that links adjacent metal ions. In this example, the first moieties of two organic linkers bridge adjacent metal ions. The first moieties may coordinate at adjacent coordination sites of each metal cation.

The first moiety comprises two donor atoms—one for coordinating to each of the adjacent metal ions. The first moiety bridges adjacent metal ions by coordination of one donor atom to each adjacent metal cation. In one example, the first moiety comprises a carboxylate group.

FIGS. 1 to 4 show the structure of an exemplary MOF of the present invention, MUF-16, in which the linker is 5-aminoisophthalate and the metal is cobalt (II). The octahedra represent the metal (for MUF-16, this is Co(II)). FIG. 1 shows an SBU of MUF-16, wherein the repeating unit in the SBU is -[$M\mu^2(OCRO)_2M\mu^2(OCRO)_2$]— (where R symbolises the remainder of the organic linker). The Co(II) cations are linked by $\mu^2$-bridging carboxylate groups of two 5-aminoisophthalate ($Haip^-$) linkers.

2-Dimensional Layer

Each organic linker in a first SBU comprises a second moiety comprising a donor atom that coordinates to a metal cation in an adjacent SBU. Coordination of the donor atom to the adjacent SBU forms a two-dimensional layer of SBUs.

In the MOFs exemplified herein, the functional group of the second moiety is an amino group.

Figure 2:
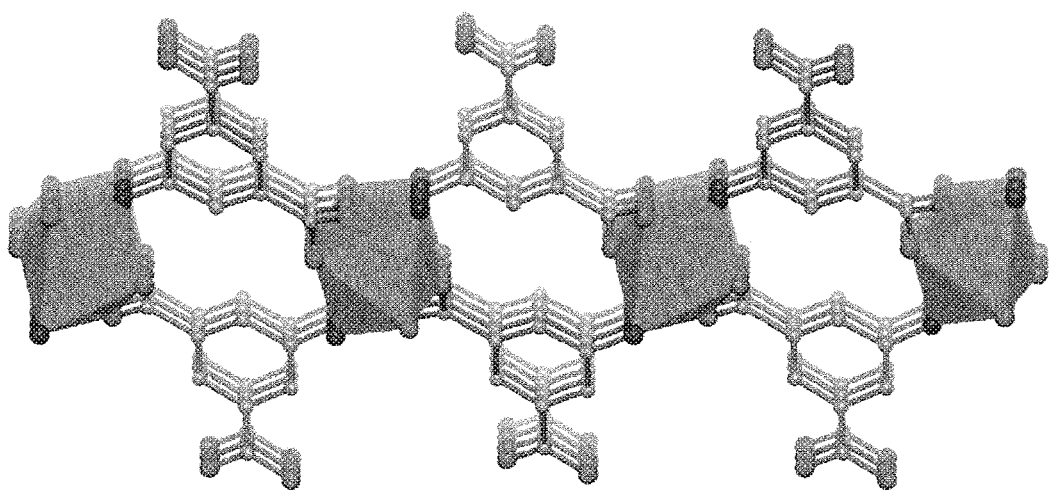
FIG. 2 shows a molecular model of a part of a layer of four connected SBUs of MUF-16.

FIG. 2 shows a section of a two-dimensional layer of SBUs of MUF-16. The amino group of the linkers in a first SBU coordinates to Co(II) ions in an adjacent SBU.

3-Dimensional Framework

The three-dimensional framework structure is formed by the stacking of the two-dimensional layers. Adjacent layers are connected together via linker-to-linker hydrogen bonding interactions between H-bonding moieties of the organic linker.

The H-bonding moiety of one linker, located in a first layer, forms a hydrogen bonding interaction with an H-bonding moiety of a linker located in a second layer adjacent the first layer.

In MUF-16, the H-bonding moieties are carboxylic acid or carboxylate groups. Where the H-bonding moieties are carboxylate groups, some or all of these are protonated. These H-bonding interactions link the two dimensional layers into three-dimensional frameworks.

Figure 3:
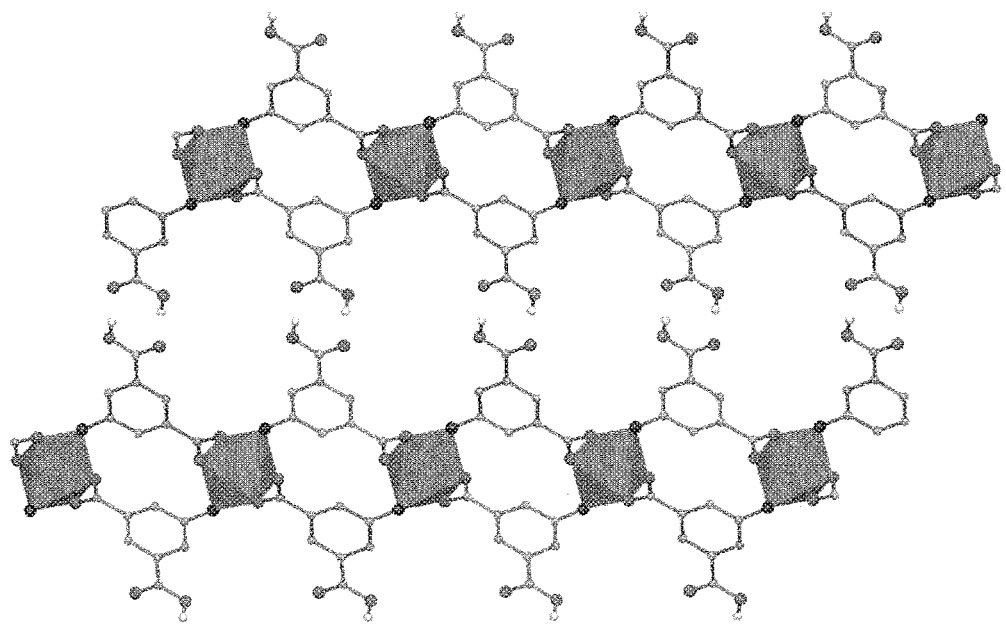
FIG. 3 shows a molecular model of the inter-layer hydrogen bonding in MUF-16.

FIG. 3 shows the inter-layer hydrogen bonding in MUF-16. Carboxylic acid groups of 5-aminoisophthalate ($Haip^-$) hydrogen bond to each other to connect the 2-dimensional layers into a 3-dimensional framework.

Figure 4:
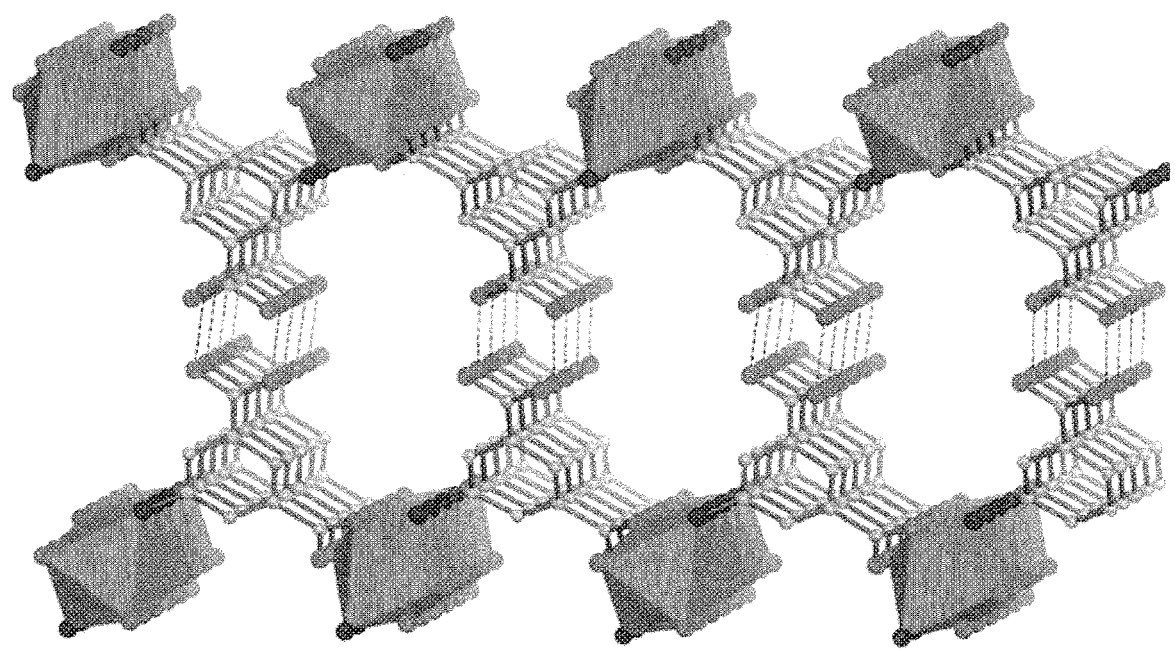
FIG. 4 shows a molecular model of the structure of MUF-16, including a view down the 1-dimensional SBUs, pores and interlayer hydrogen bonding between the layers.

With reference to crystallographic axes and the visualisation of MUF-16 in FIG. 4, the three-dimensional framework can be described as comprising 1 dimensional chains (or SBUs) of carboxyl-bridged metal ions along one of the crystallographic axes; 2-dimensional layers of adjacent SBUs across a crystallographic plane formed in part by amine coordination to the metal; and the stacking of a plurality of 2-dimensional layers via carboxylic acid bridges. Pores are formed between adjacent 2-dimensional layers. The pores are co-axial with the SBU.

Pores

The porosity of the MOF is defined by open pores having a cross section diameter sufficient for guest species to enter. The pores are arranged in a substantially regular pattern. The geometry of the pores is defined by metal-linker interactions and linker-linker interactions (in particular, linker-to-linker hydrogen bonding). The pores may 3-dimensional, 2-dimensional or 1-dimensional pores. For example, the pores may be linear, substantially 1-dimensional, channels or interconnected networks of pores extending in 2- or 3-dimensions.

In one example, the pores are linear channels.

Guest species may enter the pore of the MOF and be adsorbed on the MOF. In this way, the MOF is able to capture, store, sequester and/or purify gases or mixtures of gases. The adsorption of molecules within the pores depends on the relative steric and electronic interactions between the MOF and the guest species. The cross section of the pores determines, at least in part, whether molecules may enter the pores of the MOF. Favourable electronic interactions, such as bonding, contribute towards MOF affinity and selectivity for adsorption of the guest species. Examples of favourable electronic interactions include: van der Waals interactions, hydrogen bonding, dipole-dipole and ion-dipole interactions.

Referring to FIGS. 3 and 4, the pores of the MOF are defined between the 2-dimensional layers of connected SBUs and are substantially coaxial with the SBUs. In this way, the pores are defined in part by the interlayer distance, which is itself defined in part by the linker-to-linker bonding interactions. The pores of MUF-16 are elliptical in cross-section, having their longer dimension defined by the inter-layer linker-to-linker bonding. Single crystal x-ray diffraction (SCXRD) structural characterisation of the frameworks show one-dimensional channels running along a crystallographic axis with an approximate cross-section of approximately 6.8×2.9 Å, accounting for the van der Waals surfaces of the atoms, for MUF-16 and its Mn and Ni analogues.

The pore environment may be selective for a particular guest species. Thus, the MOF can be used to adsorb one species of molecule from a mixture. Selectivity for a particular species arises because the MOF can interact, and form stabilising bonding interactions, with a first species more strongly than a second species. Thus, the target species can be captured (e.g., separated) from the gas mixture such that the concentration of the first species in the gas mixture is substantially reduced.

Organic Linker

As described in Example 1, an exemplary linker of the present invention is 5-aminoisophthalic acid ($H_2$aip) and negatively charged anions thereof (e.g. 5-aminoisophthalate, Haip$^-$). With respect to 5-aminoisophthalate (Haip$^-$), the first moiety is a carboxylate group, in which the two oxygen atoms of the functional group are donor atoms bridging two metal cations. The 1-dimensional propagation of metal/first moiety bonding forms a SBU with a formula of $ML_2$ (see FIG. 1). The second moiety is an amino group, in which the nitrogen atom of the functional group is a donor atom which coordinates to a metal cation in an adjacent SBU. The propagation of metal/second moiety bonding forms a 2-dimensional layer of connected adjacent SBUs (see FIG. 2). The hydrogen bonding moiety is a carboxylic acid functional group, in which the carboxylic acid group hydrogen bonds to a carboxylic acid functional group of a linker in an adjacent 2-dimensional layer. H-bonding between carboxylic acids in adjacent 2-dimensional layers of MUF-16 allows the propagation of the structure along an axis orthogonal to the propagation of the 2-dimensional layer, wherein the linker-to-linker interaction comprises carboxyl-carboxyl bridges.

Each organic linker in the MOF of the present invention coordinates to three metal ions. The linker coordinates to two metal ions via the donor atoms of the first moiety, and the linker coordinates to another metal ion via the donor atom of the second moiety. Each linker bonds to another linker via linker-to-linker interactions.

Metal Cation

As described in Example 1, MOFs have been synthesised with metal cations selected from $Co^{2+}$, $Mn^{2+}$ and $Ni^{2+}$. Structural characterization of the exemplary MOFs shows that the structure is preserved where the metal cations are substituted. Gas adsorbance properties and selectivity for $CO_2$ is also preserved. Based on this finding, the identity of the metal cation is not considered essential to the framework's selectivity for $CO_2$. Accordingly, the metal cation, M, can include $Li^+$, $Na^+$, $K^+$, $Rb^+$, $Cs^+$, $Be^{2+}$, $Mg^{2+}$, $Sr^{2+}$, $Ba^{2+}$, $Sc^{3+}$, $Sc^{2+}$, $Sc^+$, $Y^{3+}$, $Y^{2+}$, $Y^+$, $Ti^{4+}$, $Ti^{3+}$, $Ti^{2+}$, $Zr^{4+}$, $Zr^{3+}$, $Zr^{2+}$, $Hf^{4+}$, $Hf^{3+}$, $V^{5+}$, $V^{4+}$, $V^{3+}$, $V^{2+}$, $Nb^{5+}$, $Nb^{4+}$, $Nb^{3+}$, $Nb^{2+}$, $Ta^{5+}$, $Ta^{4+}$, $Ta^{3+}$, $Ta^{2+}$, $Cr^{6+}$, $Cr^{5+}$, $Cr^{4+}$, $Cr^{3+}$, $Cr^{2+}$, $Cr^+$, Cr, $Mo^{6+}$, $Mo^{5+}$, $Mo^{4+}$, $Mo^{3+}$, $Mo^{2+}$, $Mo^+$, Mo, $W^{6+}$, $W^{5+}$, $W^{4+}$, $W^{3+}$, $W^{2+}$, $W^+$, $Mn^{7+}$, $Mn^{6+}$, $Mn^{5+}$, $Mn^{4+}$, $Mn^{3+}$, $Mn^{2+}$, $Mn^+$, $Re^+$, $Re^{6+}$, $Re^{5+}$, $Re^+$, $Re^{3+}$, $Re^{2+}$, $Re^+$, Re, $Fe^{6+}$, $Fe^{4+}$, $Fe^{3+}$, $Fe^{2+}$, $Fe^+$, Fe, $Ru^{8+}$, $Ru^{7+}$, $Ru^{6+}$, $Ru^{4+}$, $Ru^{3+}$, $Ru^{2+}$, $Os^{8+}$, $Os^{7+}$, $Os^{6+}$, $Os^{5+}$, $Os^{4+}$, $Os^{3+}$, $Os^{2+}$, $Os^+$, Os, $Co^{5+}$, $Co^{4+}$, $Co^{3+}$, $Co^{2+}$, $Co^+$, $Rh^{6+}$, $Rh^{5+}$, $Rh^{4+}$, $Rh^{3+}$, $Rh^{2+}$, $Rh^+$, $Ir^{6+}$, $Ir^{5+}$, $Ir^{4+}$, $Ir^{3+}$, $Ir^{2+}$, $Ir^+$, Ir, $Ni^{3+}$, $Ni^{2+}$, $Ni^+$, Ni, $Pd^{6+}$, $Pd^{4+}$, $Pd^{2+}$, $Pd^+$, Pd, $Pt^{6+}$, $Pt^{5+}$, $Pt^{4+}$, $Pt^{3+}$, $Pt^{2+}$, $Pt^+$, $Cu^{4+}$, $Cu^{3+}$, $Cu^{2+}$, $Cu^+$, $Ag^{3+}$, $Ag^{2+}$, $Ag^+$, $Au^{5+}$, $Au^{4+}$, $Au^{3+}$, $Au^{2+}$, $Au^+$, $Zn^{2+}$, $Zn^+$, Zn, $Cd^{2+}$, $Cd^+$, $Hg^{4+}$, $Hg^{2+}$, $Hg^+$, $B^{3+}$, $B^{2+}$, $B^+$, $Al^{3+}$, $Al^{2+}$, $Ga^{3+}$, $Ga^{2+}$, $Ga^+$, $In^{3+}$, $In^{2+}$, $In^{1+}$, $Ti^{3+}$, $Ti^+$, $Si^{4+}$, $Si^{3+}$, $Si^{2+}$, $Si^+$, $Ge^{4+}$, $Ge^{3+}$, $Ge^{2+}$, $Ge^+$, Ge, $Sn^{4+}$, $Sn^{2+}$, $Pb^{4+}$, $Pb^{2+}$, $As^{5+}$, $As^{3+}$, $As^{2+}$, $As^+$, $Sb^{5+}$, $Sb^{3+}$, $Bi^{5+}$, $Bi^{3+}$, $Te^{6+}$, $Te^{5+}$, $Te^{4+}$, $Te^{2+}$, $La^{3+}$, $La^{2+}$, $Ce^{4+}$, $Ce^{3+}$, $Ce^{2+}$, $Pr^{4+}$, $Pr^{3+}$, $Pr^{2+}$, $Nd^{3+}$, $Nd^{2+}$, $Sm^{3+}$, $Sm^{2+}$, $Eu^{3+}$, $Eu^{2+}$, $Gd^{3+}$, $Gd^{2+}$, $Gd^+$, $Tb^{4+}$, $Tb^{3+}$, $Tb^{2+}$, $Tb^+$, $db^{3+}$, $db^{2+}$, $Ho^{3+}$, $Er^{3+}$, $Tm^{4+}$, $Tm^{3+}$, $Yb^{3+}$, $Yb^{2+}$, $Lu^{3+}$, and any combination thereof.

In a more specific example, the metal cation is selected from the group consisting of $Mg^{2+}$, $Ca^{2+}$, $Sr^{2+}$, $Ba^{2+}$, $Sc^{3+}$, $Sc^{2+}$, $Y^{3+}$, $Y^{2+}$, $Ti^{3+}$, $Ti^{2+}$, $V^{3+}$, $V^{2+}$, $Nb^{3+}$, $Nb^{2+}$, $Cr^{3+}$, $Cr^{2+}$, $Mo^{3+}$, $Mo^{2+}$, $Mn^{3+}$, $Mn^{2+}$, $Fe^{3+}$, $Fe^{2+}$, $Ru^{3+}$, $Ru^{2+}$, $Co^{3+}$, $Co^{2+}$, $Rh^{3+}$, $Rh^{2+}$, $Ni^{2+}$, $Pd^{2+}$, $Zn^{2+}$, $Cd^{2+}$, $B^{3+}$, $Al^{3+}$, $Ga^{3+}$, $In^{3+}$, $Ti^{3+}$, $Si^{2+}$, $Ge^{2+}$, $Sn^{2+}$, $As^{3+}$, $As^{2+}$, and any combination thereof.

Method of Preparation

The MOF of the present invention may be prepared by combining the organic linker with the metal ion in a solvent. Preferably, the MOF is prepared under conditions which allow the self-assembly of the framework.

Example 1 describes the preparation of exemplary MOF frameworks of the present invention, in which the linker is 5-aminoisophthalate ($H_2$aip) and the metal ion is selected from cobalt(II), manganese(II) and nickel(II). The linker and metal ion are dissolved in a solvent and heated in a sealed vessel under autogenous pressure. The resulting MOF with the formula [M(Haip)$_2$] (M=Co, Mn or Ni) precipitates from solution in high yields.

In their as-synthesized form the pores of the MOF may contain occluded solvent (often water). Occluded solvents can be removed from the pores of the MOF by heating, or in vacuo, or by purging with a flow of dry air, or a combination of two or more of the aforementioned methods.

Crystallinity and Macrostructure

Referring to Example 2, SCXRD and powder XRD show that the MOF compounds are crystalline (See Tables 1 and 2).

As shown in FIGS. 1-4, the metal ions adopt an octahedral geometry with four carboxylate and two amino donors, arranged trans to one another, from six different linkers. More specifically, M(II) atoms with octahedral geometry line up into a 1D chain along a crystallographic b axis through bridging carboxylate groups from Haip linkers. Two adjacent chains are linked together into 2D layers by Haip linkers. One of the two carboxylate groups of each Haip linker coordinates to M(II) and the other one acts as a hydrogen-bond acceptor and donor.

Figure 5:
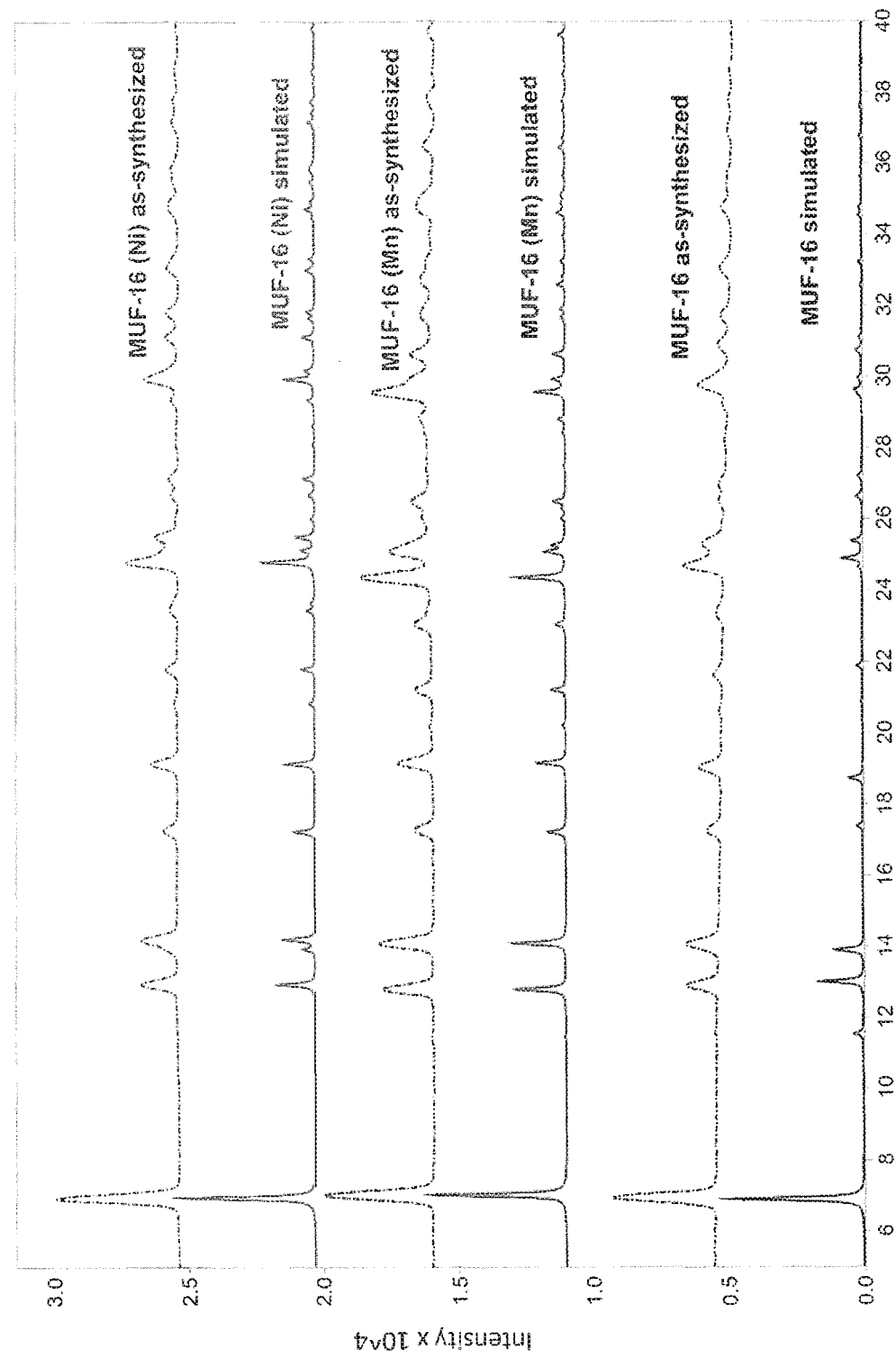
FIG. 5 shows PXRD patterns of MUF-16, MUF-16(Mn) and MUF-(Ni) with comparisons between measurements on as-synthesized bulk samples and diffractograms predicted from single crystal x-ray diffraction (SCXRD) structures.

Powder XRD of Co(II), Mn(II) and Ni(II) frameworks (shown in FIG. 5) confirms the crystalline structure of the MOF of the present invention, and further confirms that the framework is preserved with the substitution of metal ions.

Adsorption and Selectivity

The MOF frameworks are accessible to a range of incoming gases, including monoatomic and diatomic gases, carbon dioxide, and C1-C3 hydrocarbons. Referring to Example 3 and Table 3, nitrogen adsorption isotherms measured at 77 K gave BET surface areas of 215, 209 and 238 m$^2$/g for MUF-16, MUF-16(Mn), and MUF-16(Ni), respectively. Total pore volumes of 0.11 cm$^3$/g were measured for all three frameworks. These values are comparable with the geometric surface areas and pore volumes calculated from the crystallographic coordinates.

The MOF of the present invention has particular use in the adsorption of carbon dioxide. The capacities of the MOFs of the present invention to host $CO_2$ is considerable: both MUF-16 and MUF-16(Ni) take up 2.13 mmol/g (48 cm$^3$/g) at 1 bar, and MUF-16(Mn) adsorbs 2.25 mmol/g (50.5 cm$^3$/g). This equates to approximately 0.9 molecules of $CO_2$ per metal site. $CO_2$ adsorption isotherms for MUF-16, MUF-16(Mn) and MUF-16(Ni) (FIGS. 6 to 8) rise steeply at low pressures and nearly plateau towards 1 bar, which indicates a strong affinity of the frameworks for the $CO_2$ guests.

The pores of the MOF of the present invention are nearly saturated at 293 K and 1 bar, so $CO_2$ uptake is only marginally higher at 273 K, showing that the MOF of the present invention can be readily used at, and above, ambient temperatures.

Electronic interactions are physisorptive or non-covalent in nature. XRD analysis of the position and orientation of the $CO_2$ in the pores of MUF-16(Mn) (see Example 2) suggests that one of the electronegative oxygen atoms of the $CO_2$ molecule engages in N—H—O and C—H—O interactions with hydrogen atoms of amino and phenyl groups, respectively. Similarly, the electropositive carbon atom of the $CO_2$ molecule contacts an oxygen atom of a non-coordinated carboxylate group. Therefore, the data suggests that the selectivity for $CO_2$ is, at least in part, due to the complementary electronic interactions between the pore walls and the δ+ and δ− regions of carbon dioxide.

The MOFs of the present invention are shown herein to preferentially adsorb carbon dioxide from a mixture of gases. Referring to Examples 3 to 5, the high uptake of $CO_2$ by the MOFs of the present invention stands in contrast to other gases. Referring to FIG. 9(a), experimental adsorption isotherms of $H_2$, Ar, $N_2$, $CH_4$, $O_2$, $C_2H_2$, $C_2H_4$, $C_2H_6$, $C_3H_6$ and $C_3H_8$ showed that only modest quantities of these gases are adsorbed. For example, and as shown in Table 6, MUF-16 takes up just 1.32 and 1.20 $cm^3/g$ of $N_2$ and $CH_4$ at 1 bar and 293 K, respectively, which rises to the highest value amongst the measured adsorbates of 5.35 $cm^3/g$ for $C_3H_6$.

The MOFs of the present invention have a selective uptake of $CO_2$ over $N_2$, having uptake ratios between 17.6 and 36.2 (see Table 5). The preferential uptake of $CO_2$ over $N_2$ for MUF-16 is comparable to the benchmark physisorbent $[Cd_2L(H_2O)]$,[11] and elevated beyond materials such as SIFSIX-2-Cu-i[12] and DICRO-3-Ni-i[13]. While some materials that trap $CO_2$ by chemisorption show higher uptake ratios, including for example the amine-functionalised framework en-Mg-dobpdc,[14] such chemisorptive frameworks require significant energy input to desorb the captured $CO_2$ and are therefore not suited for many $CO_2$ separation applications.

MUF-16 adsorbs more $CO_2$ than C2 and C3 hydrocarbons, having uptake ratios of between 9.0 and 15.9 at 293 K and 1 bar (see Table 6). This contrasts with typical physisorbents, which show a preference for unsaturated hydrocarbons especially when bonding between the guest's pi-electrons and open metal sites can occur.[15]

While the low uptake of the monatomic and diatomic gases is a well-established function of their small polarizabilities and small (or zero) quadrupole moments, the diminished affinity for the larger (C1-3) non-functionalised hydrocarbon guests is notable. Without wishing to be bound by theory, the inventors believe that the diminished affinity for the C2-C3 hydrocarbon guests is due to the guests' electropositive regions around the termini of the hydrocarbons, which leads to repulsive interactions with the framework pore surface. For example, the positive electrostatic potential at the termini of ethyne, ethene, ethane and propane is in contrast with the negative electrostatic potential of the termini of $CO_2$. The uptake of ethyne (and other non-functionalised hydrocarbons) in MUF-16 may be explained by relatively energetically unfavourable repulsive forces arising due to interactions between δ+ areas of ethyne and δ+ areas of MUF-16, and similarly repulsive interactions between δ− areas of ethyne and δ− areas of MUF-16, assuming the ethyne molecules were to occupy the sites crystallographically observed for the binding of $CO_2$.

Without wishing to be bound by theory, the inventors believe that the affinity and selectivity for $CO_2$ in the MOF of the present invention is due to, firstly, the dimensions of the framework pores match the size of the $CO_2$ molecules, which allows these molecules to be enveloped by multiple non-covalent contacts. Secondly, $CO_2$ carries electronegative potential at its terminal oxygen atoms, compared to the electropositive central carbon atom. $CO_2$ therefore has more favourable interactions with the pore surface.

While the selectivity of the MOF of the present invention for $CO_2$ in the presence of certain hydrocarbons, monatomic and diatomic gases has been exemplified herein, the inventors believe it is a reasonable extrapolation for the MOF of the present invention to have similar adsorptive properties for guest molecules with similar properties. Examples include carbon disulfide, nitrous oxide, and C1-C3 functionalised hydrocarbons (including hydrogen cyanide, acetonitrile, C1-C3 alcohols, C1-C3 aldehydes, C1-C3 nitriles, C1-C3 alkyl halides and cyanogen). It is a reasonable extrapolation for the MOF to be similarly selective for these compounds in the presence of non-functionalised hydrocarbons, monatomic and diatomic gases.

The low affinity of the MOF of the present invention towards non-functionalised hydrocarbons and monatomic and diatomic gases exemplified herein means that, in addition to carbon dioxide, the MOF is also selective for small polar and polarisable compounds from a mixture further comprising non-functionalised hydrocarbons, monatomic and diatomic gases. Accordingly, the inventors consider that the MOF will selectively adsorb carbon dioxide, carbon disulfide, nitrous oxide, water, hydrogen sulfide, hydrogen cyanide, cyanogen and C1-C3 functionalised hydrocarbons from a mixture that includes non-functionalised hydrocarbons.

Figure 6:
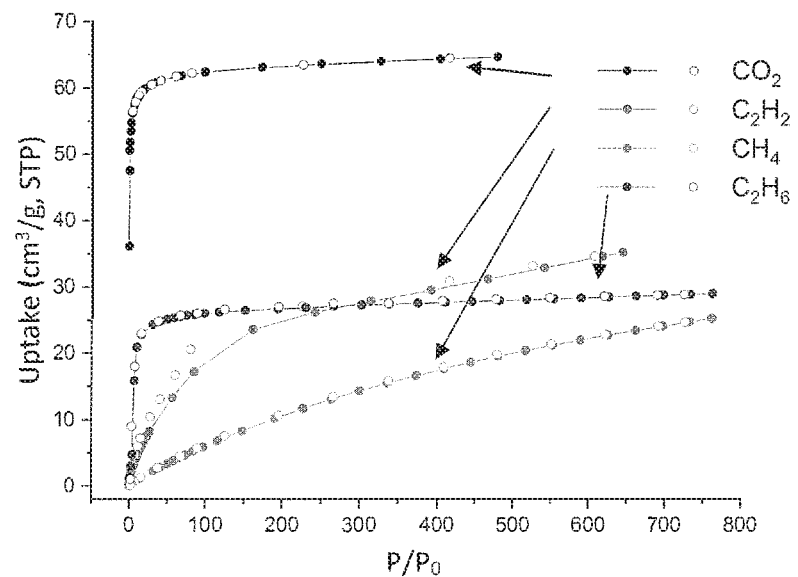
FIG. 6 shows volumetric adsorption (filled circles) and desorption (open circles) isotherms of $CO_2$, $C_2H_2$, $C_2H_6$ and $CH_4$ measured at 195 K for MUF-16.
Figure 7:
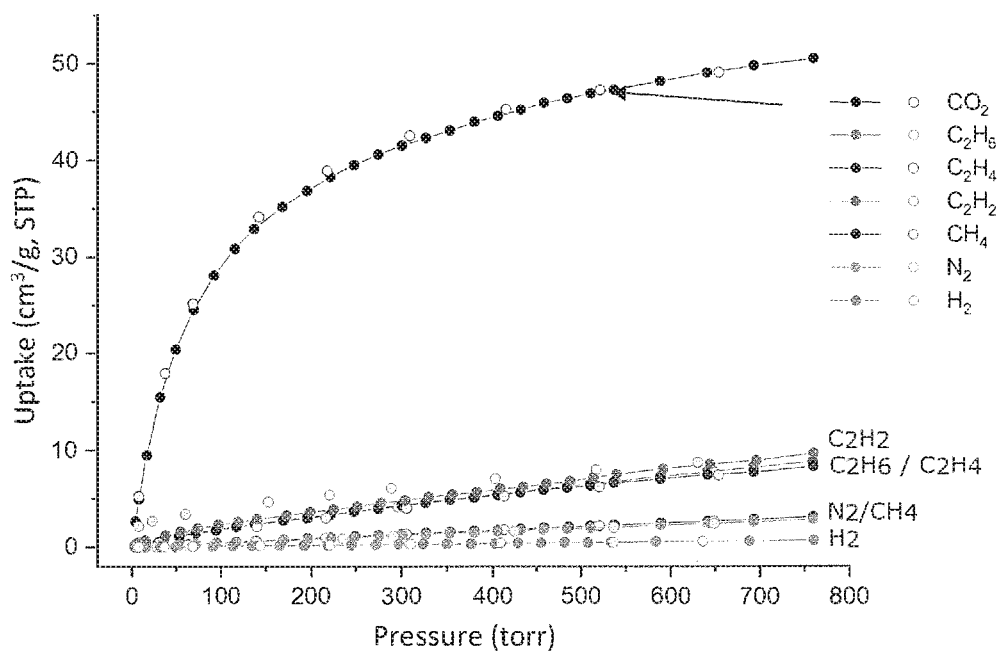
FIG. 7 shows volumetric adsorption (filled circles) and desorption (open circles) isotherms of different gases by MUF-16(Mn) at 293 K.
Figure 8:
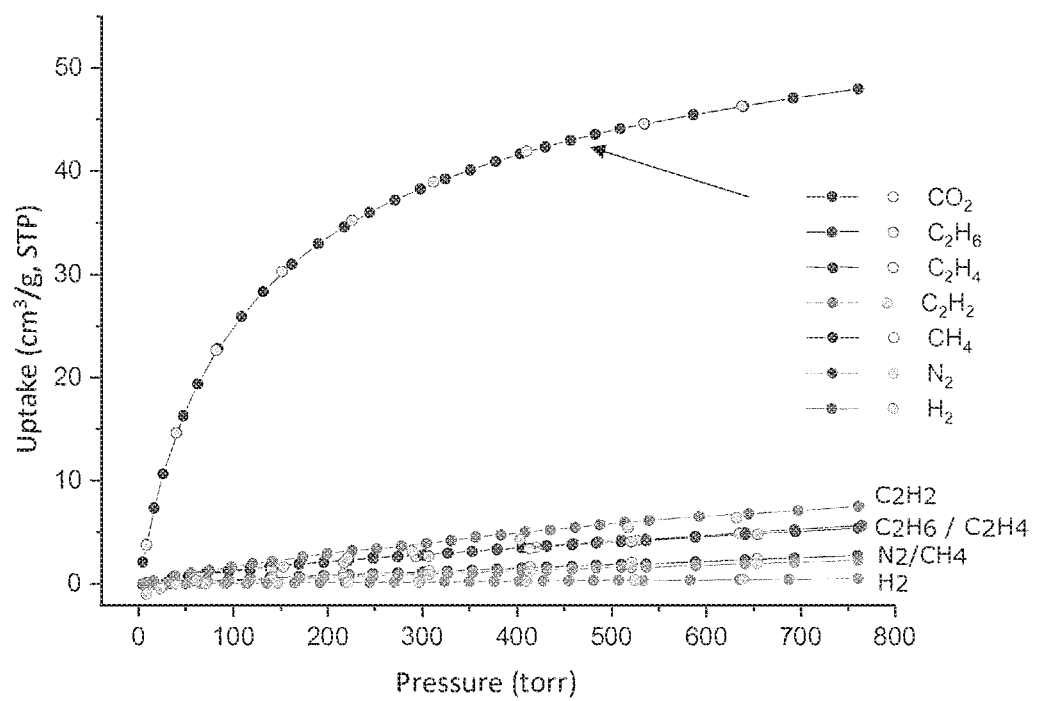
FIG. 8 shows volumetric adsorption (filled circles) and desorption (open circles) isotherms of different gases by MUF-16(Ni) at 293 K.
Figure 9:
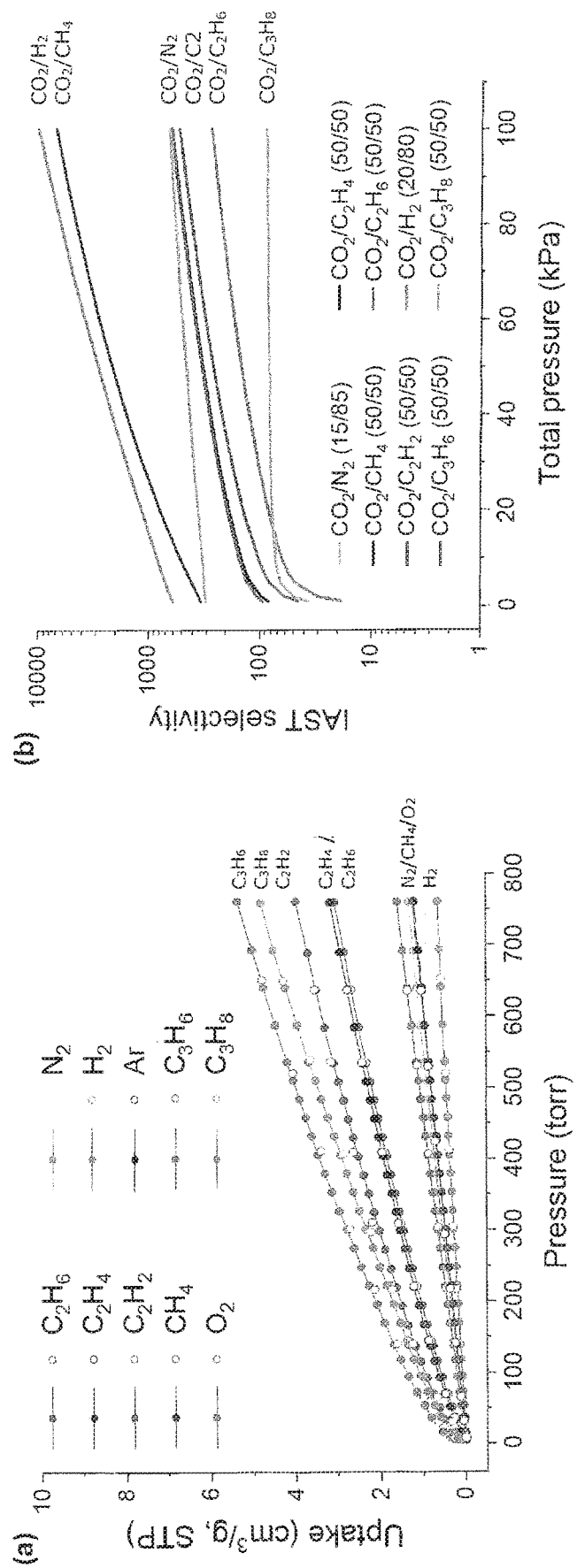
FIG. 9 shows (a) Experimental $H_2$, Ar, $N_2$, $CH_4$, $O_2$, $C_2H_2$, $C_2H_4$, $C_2H_6$, $C_3H_6$ and $C_3H_8$ adsorption (solid spheres) and desorption (open spheres) isotherms of MUF-16 measured at 293 K. (b) Predicted IAST selectivities, displayed with a log scale, of MUF-16 for various gas mixtures at 293 K.
Figure 11:
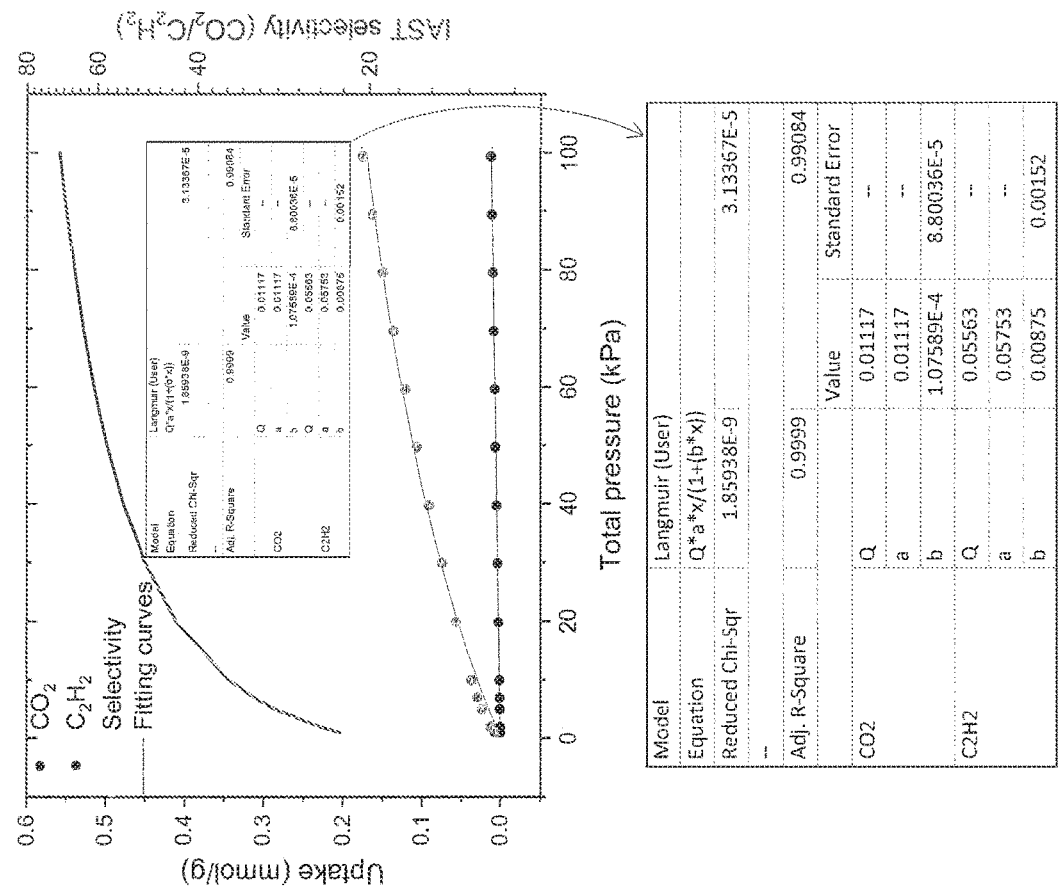
FIG. 11 shows mixed-gas isotherms and selectivity of MUF-16 predicted by IAST for a mixture of 0.1/99.9 $CO_2/C_2H_2$ at 293 K.
Figure 10:
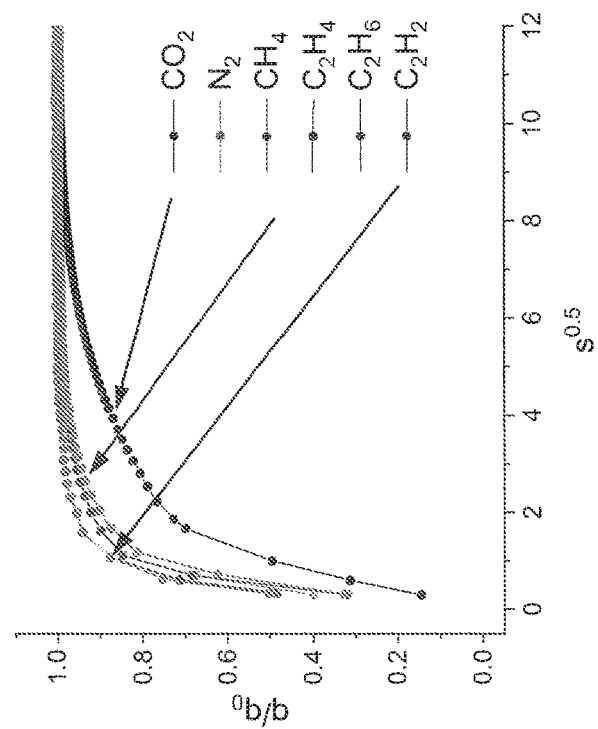
FIG. 10 shows kinetic profiles of different gas uptake by MUF-16 at 293 K upon exposing an evacuated sample to a dose of gas equal to its measured total adsorption of that gas at 1 bar. q is the amount of uptake at time t and $q_0$ is the final uptake amount.

In order to rule out the possibility that the selectivity mechanism of the MOFs of the present invention rely on molecular sieving (i.e. size exclusion), the inventors measured gas adsorption isotherms at 195 K which revealed that MUF-16 is able to take up significant amounts of $C_2H_6$. FIG. 6 shows the volumetric adsorption and desorption isotherms of $CO_2$, $C_2H_2$, $C_2H_6$ and $CH_4$ for MUF-16, and clearly shows that each molecule can freely enter the pore network. FIGS. 7 to 9, which show volumetric adsorption/desorption isotherms of MOFs of the present invention at ambient temperatures, show that the uptake of ethyne, ethene, ethane, methane and nitrogen is low at ambient temperatures. FIG. 9(a) further shows low uptake of oxygen, argon, hydrogen, propane and propene. The kinetics of adsorption of guest molecules $CO_2$, $N_2$, $CH_4$, $C_2H_4$, $C_2H_6$, $C_2H_2$ onto MUF-16 were measured by exposing an evacuated sample of the MOF to a dose of gas equal to its measured total adsorption of that gas at 1 bar. The results are shown in FIG. 10 (q is the amount of uptake at time t and q0 is the final uptake amount), which shows that all gases measured reach their equilibrium uptake in well under one minute and the uptake rates are similar for all gases. Therefore, thermodynamic—rather than kinetic—effects have the most decisive impact on the differential affinity of these gases for MUF-16.

IAST—Gas Mixtures

While the uptake ratios for the MOFs of the present invention provide an excellent indication of preferential affinity, the selectivity for a particular component of a gas mixture can be quantified by Ideal Adsorbed Solution Theory (IAST) calculations. IAST calculations for the MOFs of the present invention show exceptional preference for $CO_2$ in the presence of $N_2$, $H_2$, certain C1-C3 hydrocarbons and mixtures thereof.

Referring to Example 4 and Table 6, the MOFs of the present invention have high selectivity for $CO_2$ in the presence of $N_2$, $H_2$, $CH_4$, $C_2H_2$, $C_2H_4$, $C_2H_6$, $C_3H_6$, and $C_3H_8$ (also see FIG. 9(b)). As the IAST data described herein show that $CO_2$ can be separated from mixtures of hydrogen, nitrogen and certain C1-C3 hydrocarbons, and in light of the uptake data for $O_2$ and Ar (see FIG. 9(a)), it is reasonable to expect that the MOFs of the present invention are highly selective for $CO_2$ in the presence of other gases.

Figures 12, 13:
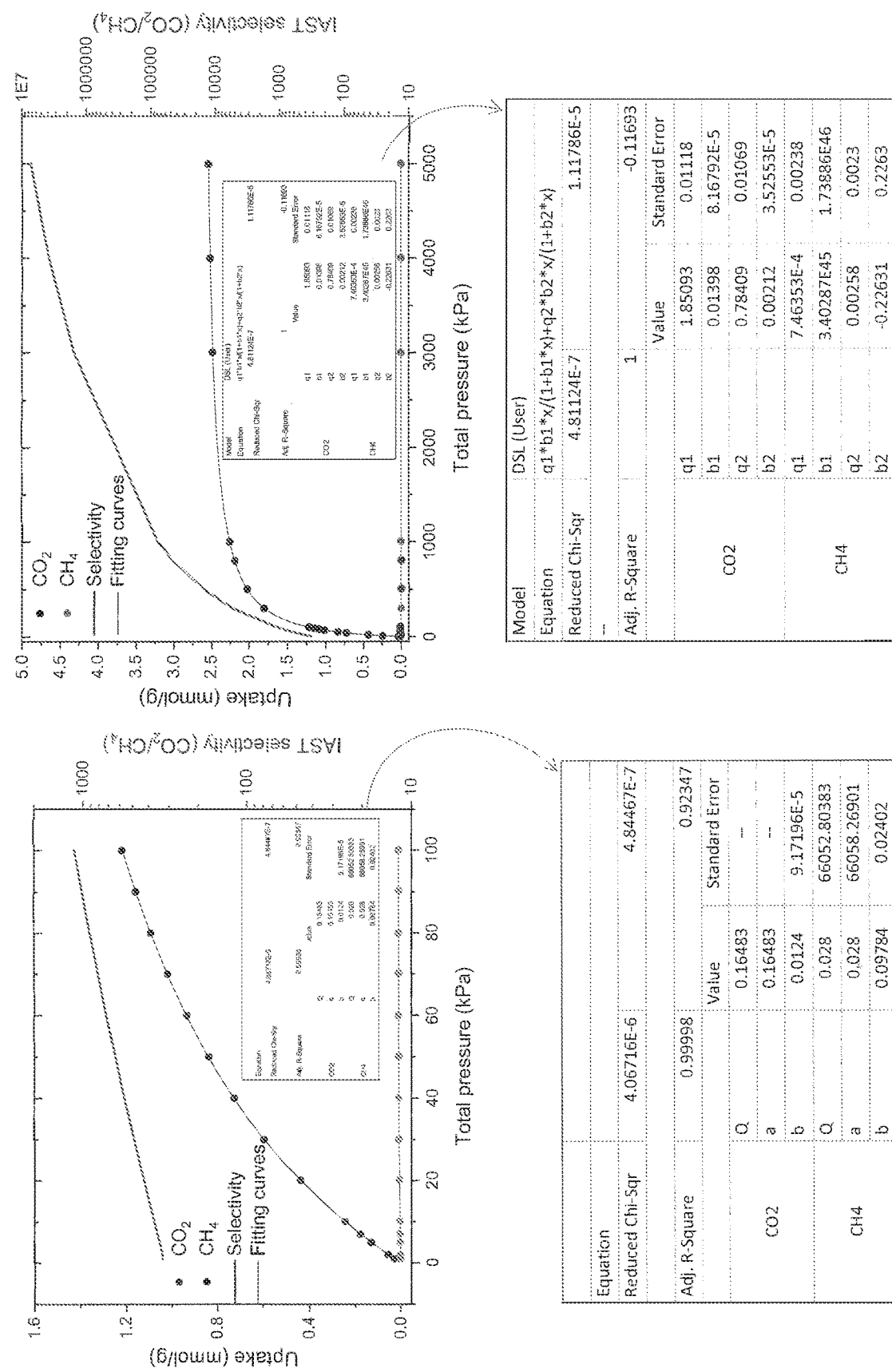
FIG. 12 shows mixed-gas isotherms and selectivity of MUF-16 predicted by IAST for a mixture of 15/85 $CO_2/CH_4$ at 293 K.
FIG. 13 shows mixed-gas isotherms and selectivity of MUF-16 predicted by IAST for a mixture of 15/85 $CO_2/CH_4$ at 293 K up to 50 bar.
Figures 14, 15:
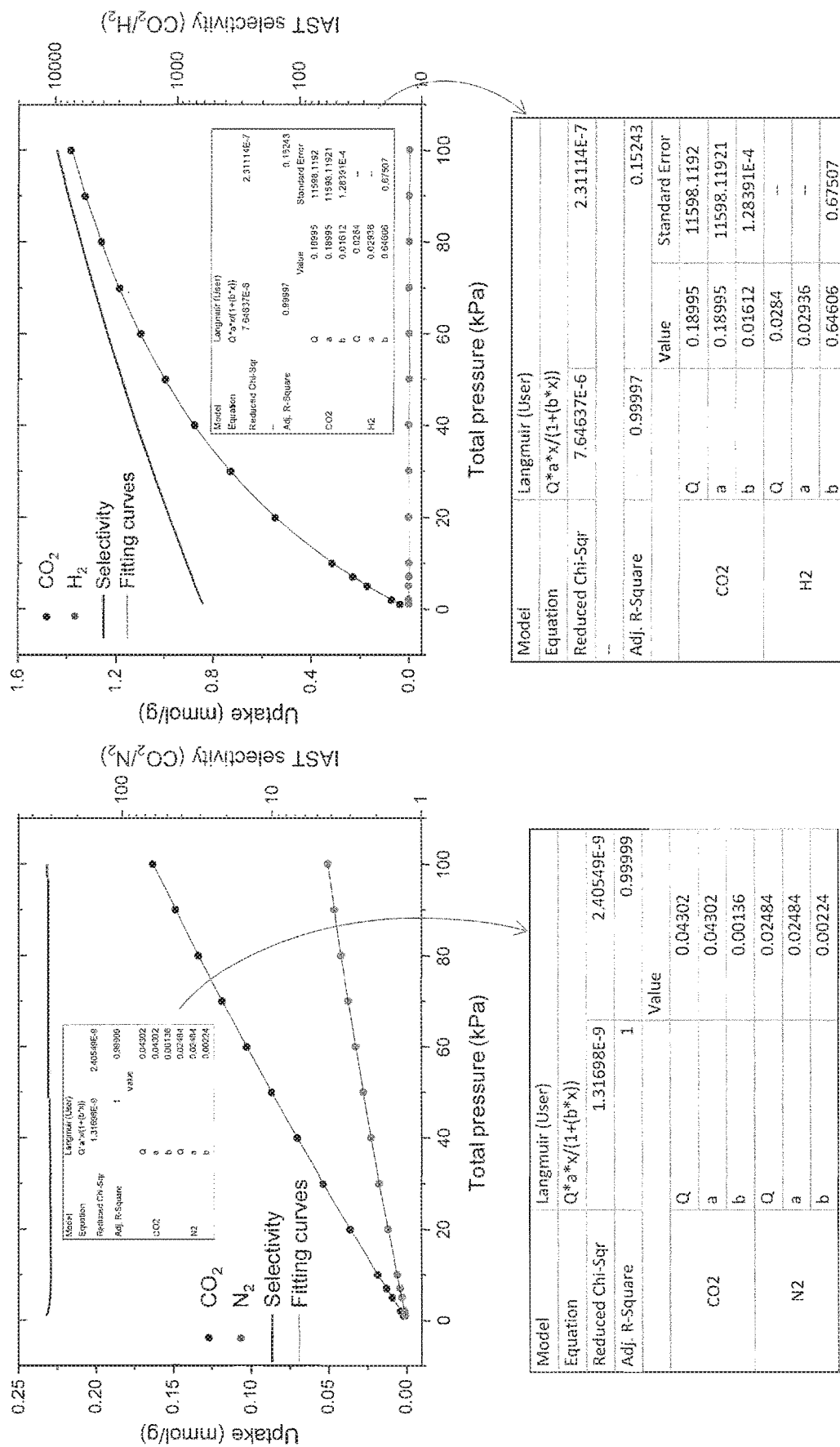
FIG. 14 shows mixed-gas isotherms and selectivity of MUF-16 predicted by IAST for a mixture of 1/99 $CO_2/N_2$ at 293 K.
FIG. 15 shows mixed-gas isotherms and selectivity of MUF-16 predicted by IAST for a mixture of 20/80 $CO_2/H_2$ at 293 K.
Figures 16, 17:
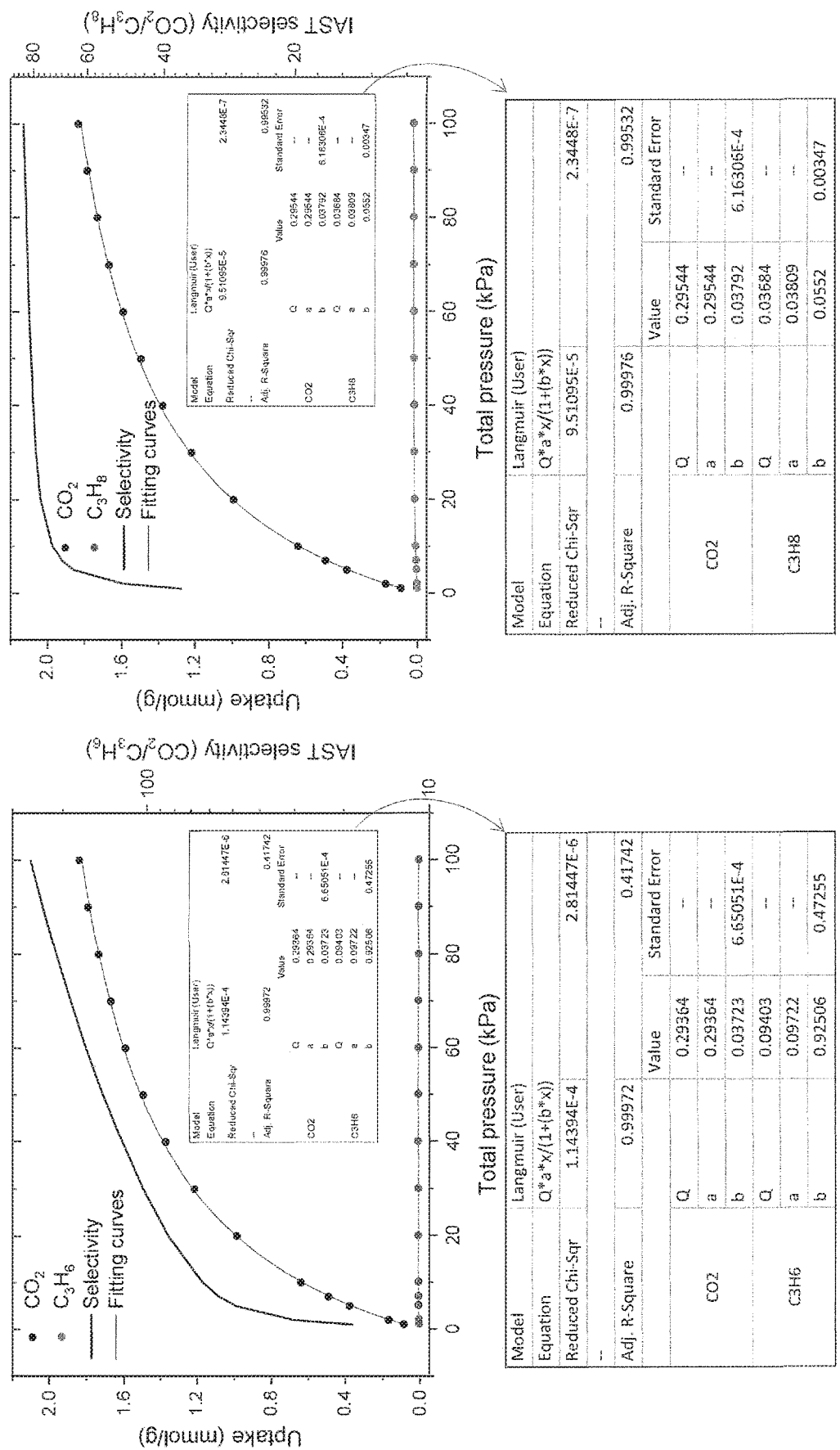
FIG. 16 shows mixed-gas isotherms and selectivity of MUF-16 predicted by IAST for a mixture of 50/50 $CO_2/C_3H_6$ at 293 K.
FIG. 17 shows mixed-gas isotherms and selectivity of MUF-16 predicted by IAST for a mixture of 50/50 $CO_2/C31-18$ at 293 K.
Figure 18:
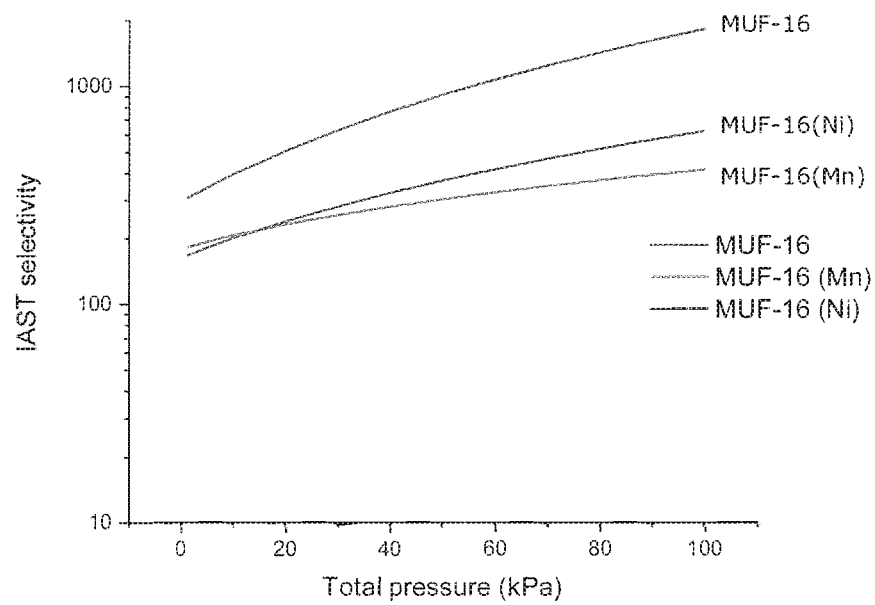
FIG. 18 shows IAST selectivity for a 50/50 mixture of $CO_2/N_2$ at 293 K for the MUF-16 family.
Figure 19:
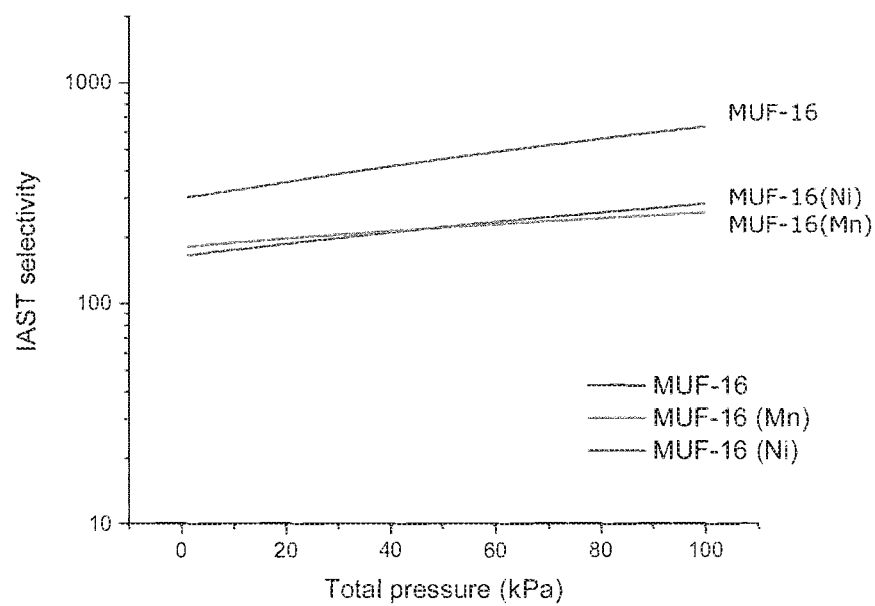
FIG. 19 shows IAST selectivity for a 15/85 mixture of $CO_2/N_2$ at 293 K for the MUF-16 family.
Figure 20:
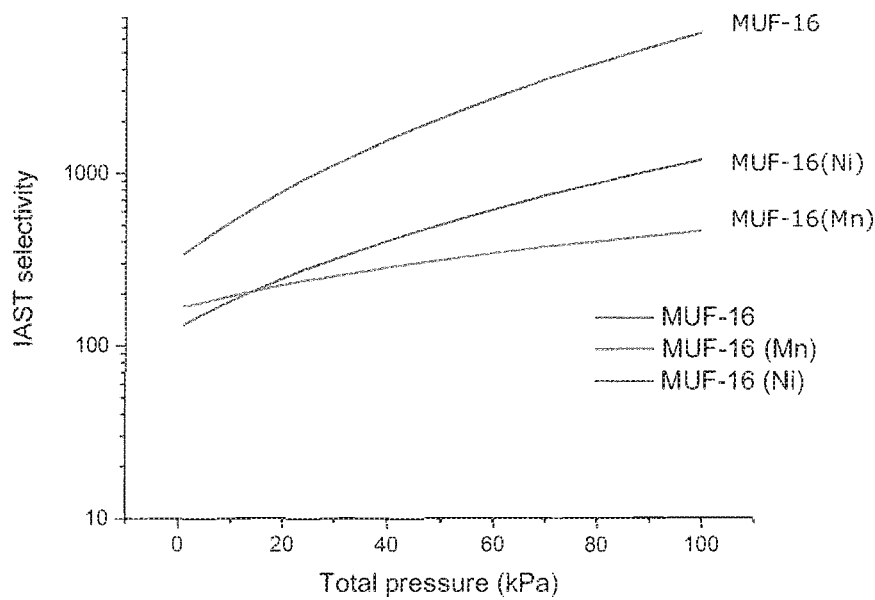
FIG. 20 shows IAST selectivity for a 50/50 mixture of $CO_2/CH_4$ at 293 K for the MUF-16 family.
Figure 21:
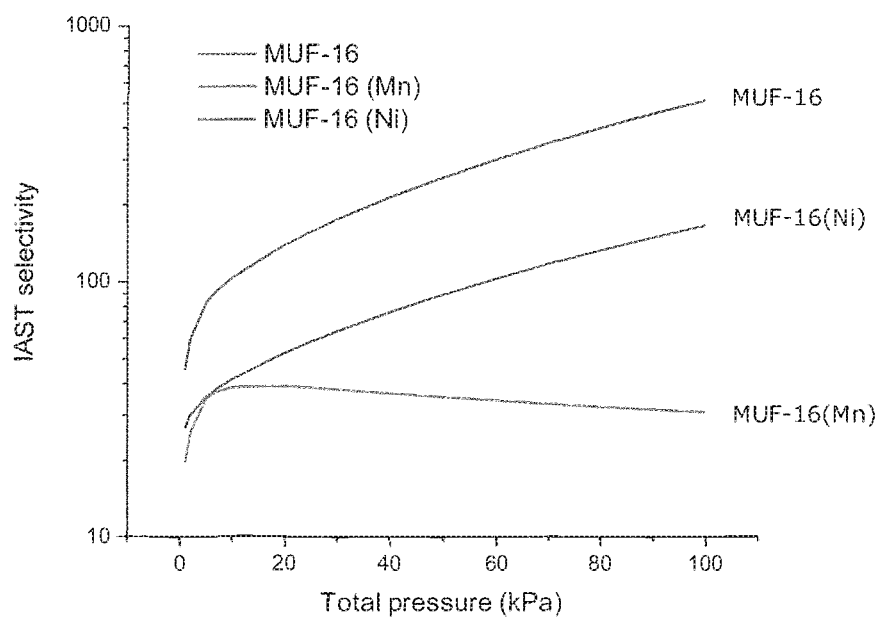
FIG. 21 shows IAST selectivity for a 50/50 mixture of $CO_2/C_2H_2$ at 293 K for the MUF-16 family.
Figure 22:
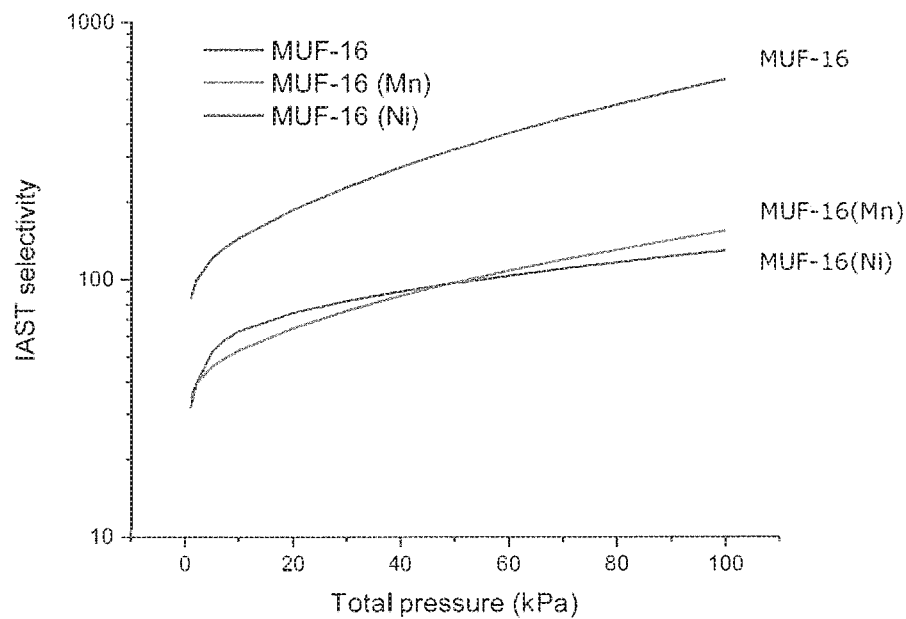
FIG. 22 shows IAST selectivity for a 50/50 mixture of $CO_2/C_2H_4$ at 293 K for the MUF-16 family.
Figure 23:
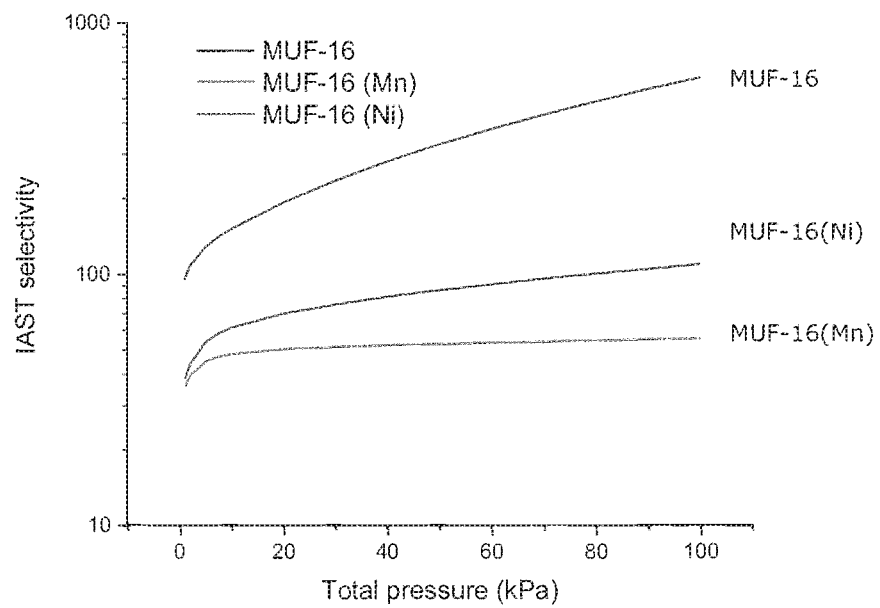
FIG. 23 shows IAST selectivity for a 50/50 mixture of $CO_2/C_2H_6$ at 293 K for the MUF-16 family.
Figure 24:
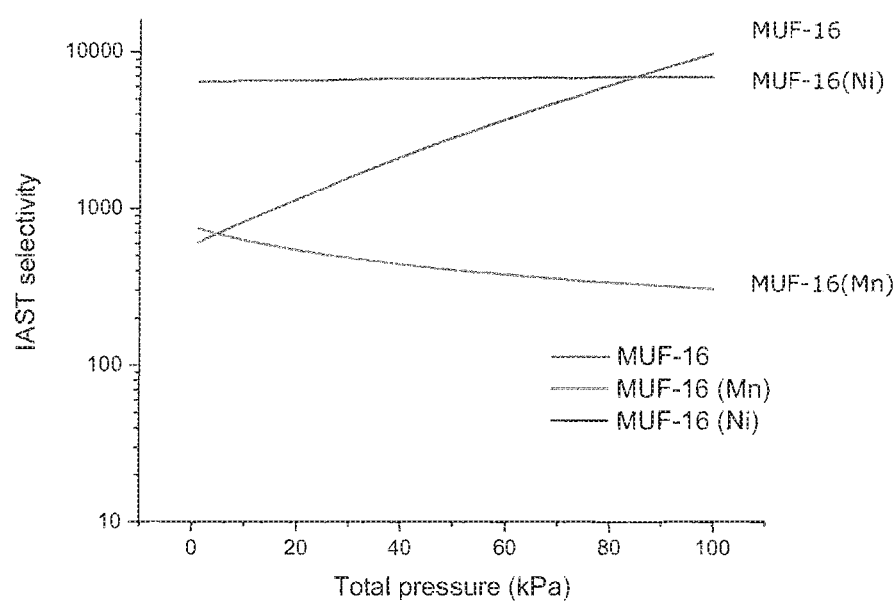
FIG. 24 shows IAST selectivity for a 50/50 mixture of $CO_2/H_2$ at 293 K for the MUF-16 family.

FIGS. 11 to 24 show mixed gas isotherms and selectivity of MUF-16 predicted by IAST for combinations of gases. IAST calculations show the MOFs of the present invention remain highly selective for $CO_2$ in the presence of $H_2$, $N_2$, and non-functionalised C1-3 hydrocarbons at pressures above 1 bar. For example, FIG. 13 shows both uptake data and IAST calculations demonstrating that the MOFs of the present invention remain highly selective for $CO_2$ in the presence of methane at 50 bar (5,000 kPa).

Breakthrough Testing

The IAST data discussed herein are backed up by experimental data from breakthrough measurements showing performance of the MOFs under real operating conditions. An apparatus comprising a chamber for receiving the MOF of the present invention was assembled. The apparatus allowed the MOF to be exposed to a mixture of gases at particular pressures and temperatures. Pressure and temperature of the MOF could be varied by temperature and pressure controllers. Specific details of the breakthrough apparatus are described in Example 5 and shown in FIG. 25.

Breakthrough separation measurements showed that MUF-16 selectively adsorbs $CO_2$ from mixtures comprising $H_2$, $N_2$, and mixtures of non-functionalised C1-3 hydrocarbons. Breakthrough curves for separation of $CO_2$ from gas mixtures are shown in FIGS. 26 to 37. Breakthrough data is shown in Table 9. The data show that MUF-16 efficiently retained $CO_2$ and delivered pure $N_2$ for $CO_2/N_2$ mixtures in proportions of 50/50, 15/85, 1/99 and 0.4/99.6. Similarly, $CO_2$ is retained and pure hydrocarbon is delivered from hydrocarbon/$CO_2$ mixtures, as shown by breakthrough data for the mixtures of 15/85 $CO_2/CH_4$, 5/95 $CO_2/C_2H_2$, 50/50 $CO_2/C_2H_4$ and 50/50 $CO_2/C_2H_6$.

Figure 35:
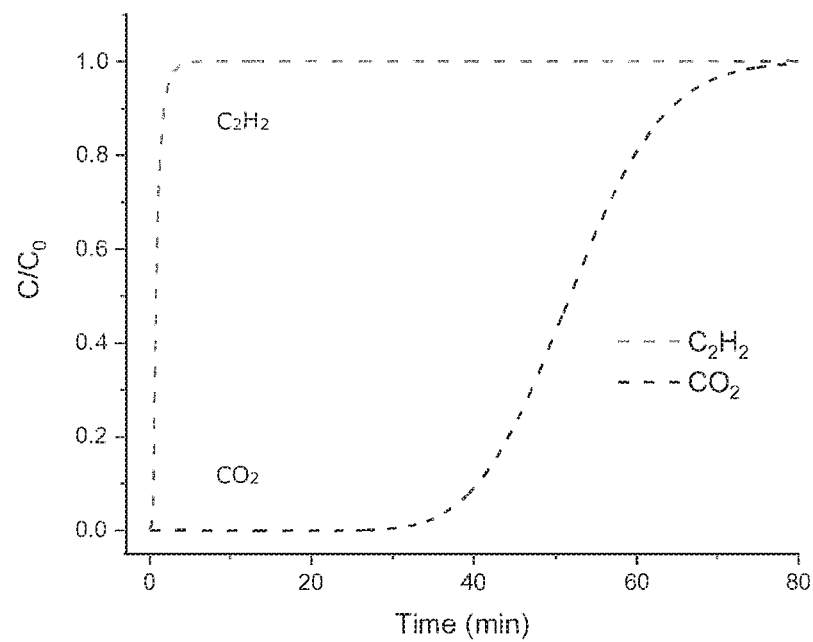
FIG. 35 shows simulated breakthrough curves for a mixture of 0.1/99.9 $CO_2/C_2H_2$ at 1.1 bar and 293 K in an adsorption column packed with MUF-16.

The simulated breakthrough profile shown in FIG. 35 extends the experimental results by demonstrating that MUF-16 is capable of eliminating trace quantities of $CO_2$ from $C_2H_2$ (i.e. 0.1% $CO_2$ in an ethyne stream) to produce a stream of high-purity $C_2H_2$.

Figure 36:
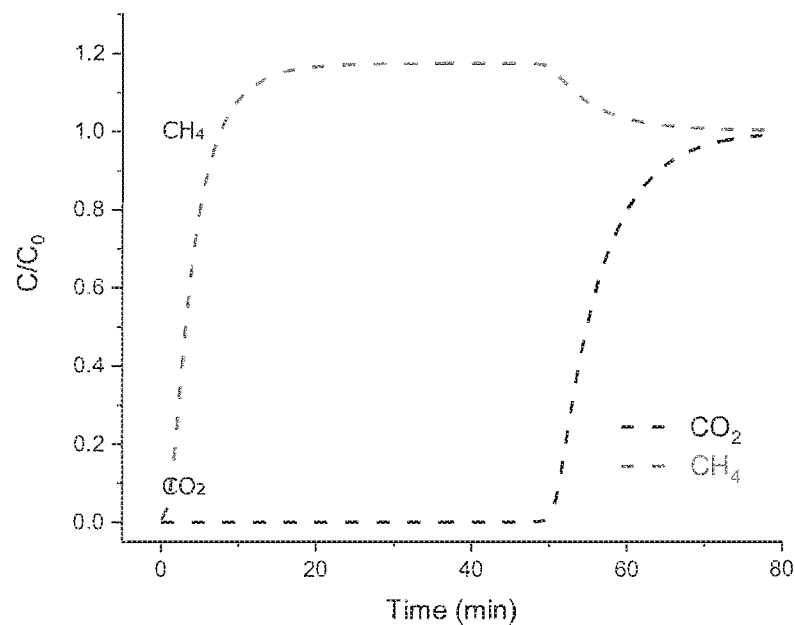
FIG. 36 shows simulated breakthrough curves for a mixture of 15/85 $CO_2/CH_4$ at 50 bar and 293 K in an adsorption column packed with MUF-16.

The simulated breakthrough profile shown in FIG. 36 models the separation of $CO_2$ from $CO_2/CH_4$ mixtures at high pressures (9 bar), and shows that $CO_2$ is cleanly removed from the gas stream. The dynamic uptake capacity for $CO_2$ is higher at 9 bar than that measured at 1 bar. Extrapolation of these data to pressures relevant to natural gas processing (~40-60 bar) predicts that MUF-16 can efficiently sequester $CO_2$ from raw natural gas streams.

The breakthrough testing indicates that MUF-16 is an excellent adsorbent under dynamic conditions. The dynamic capacities for $CO_2$ derived from these breakthrough measurements of MUF-16 are nearly identical to the equilibrium capacities at the corresponding partial pressures (see Table 9). This indicates that the MOFs of the present invention are an excellent adsorbent under dynamic conditions, which stems from a combination of (i) differential affinity for the two gases, (ii) the short time delay for the appearance of the non-adsorbed $N_2$ and its near-vertical elution profile.

Regeneration

The MOFs of the present invention can be fully regenerated and recycled for $CO_2$ capture. During breakthrough testing, complete $CO_2$ desorption of MUF-16 was achieved by placing it under a dynamic vacuum or by purging with a flow of dry air ($CO_2$ content <200 ppm) at room temperature and 1 bar. The $CO_2$ profile in the eluent from the adsorption bed was measured to show the $CO_2$ is released within 25 minutes.

Alternatively, the adsorption bed could be regenerated under a dynamic vacuum (turbomolecular pump) for around 15-20 minutes at room temperature.

Alternatively, the adsorption bed could be regenerated at elevated temperatures.

Figure 37:
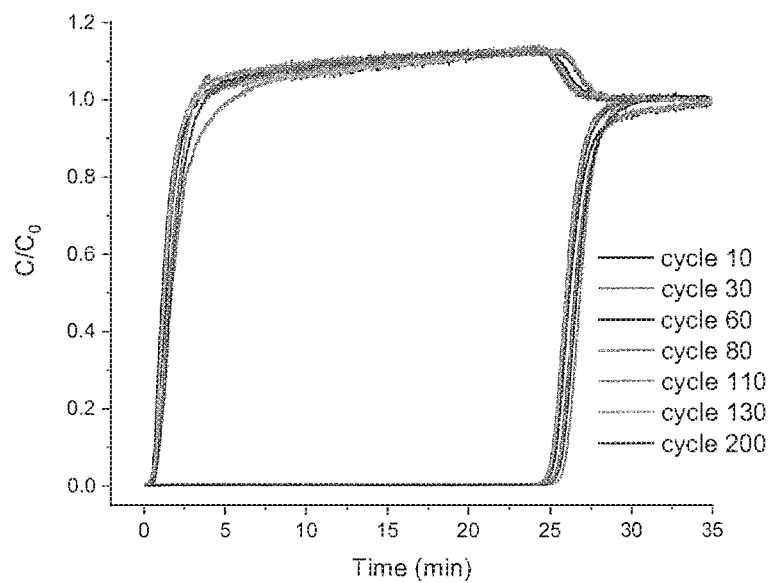
FIG. 37 shows experimental breakthrough curves of $CO_2/N_2$ (15/85) mixture at different cycles at 293 K and 1.1 bar for MUF-16.

FIG. 37 shows the recyclability of MUF-16; the MOF shows virtually no change in its separation activity after 200 breakthrough-regeneration cycles for the separation of $CO_2/N_2$. In line with its high stability, MUF-16 maintains its separation performance and uptake capacity over this period.

Stability/Robustness

Figure 38:
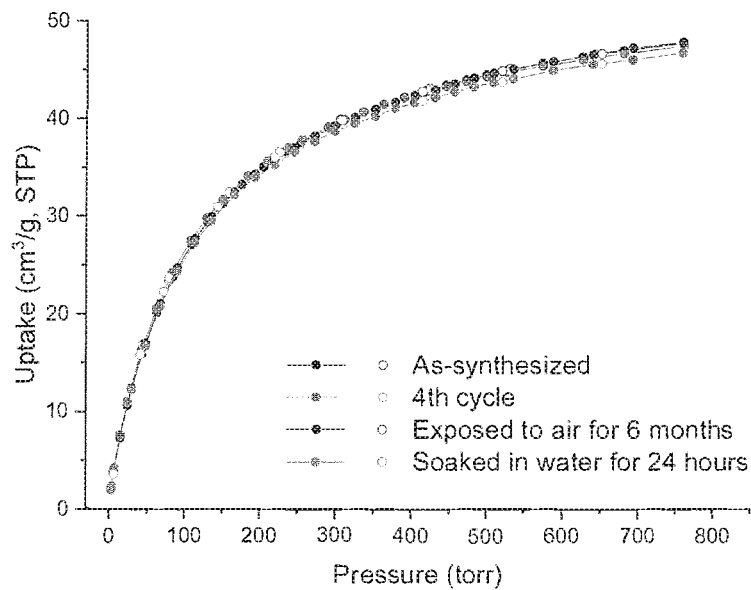
FIG. 38 shows $CO_2$ adsorption isotherms (293 K) of as-synthesized MUF-16 after four consecutive adsorption-desorption cycles, after exposing it to air with ~80% humidity for 6 months, and after immersion in water for 24 hours.

The MOFs of the present invention also have extraordinary water resistance and thermal stability. FIG. 38 shows that the uptake of $CO_2$ for MUF-16 remains substantially constant after four cycles, being exposed to air for six months, and after being immersed in water for 24 hours. Shown in FIG. 39, PXRD of MUF-16 samples shows that the MOF structure remains unchanged after activation at 130° C. under vacuum, after isotherm measurements, after breakthrough experiments, after exposure to an air with relative humidity of >80% for at least 12 months and after immersion in water for two weeks. MUF-16(Mn) and MUF-16(Ni) have similar stability in the presence of water, humidity and temperatures of 130° C. under vacuum.

Figure 40:
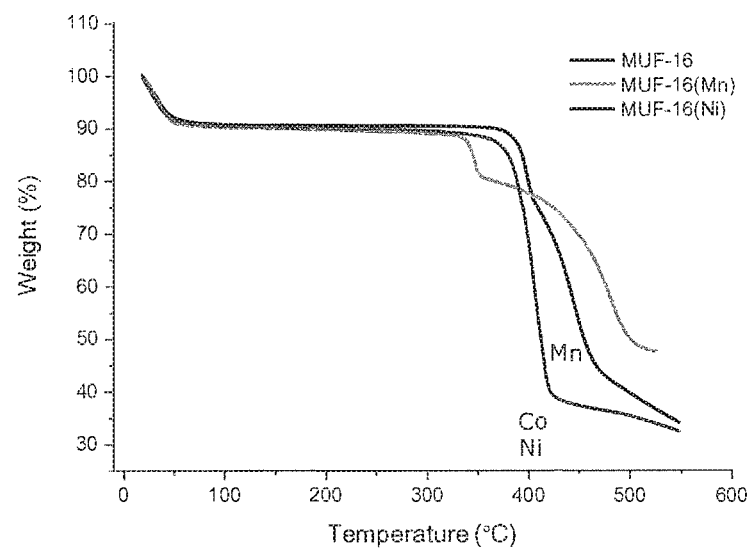
FIG. 40 shows thermogravimetric analysis curves of MUF-16, MUF-16(Mn), and MUF-16(Ni).

Thermogravimetric analysis demonstrated the thermal stability of MUF-16, and its Mn and Ni analogues beyond 330° C. under nitrogen (FIG. 40).

Figure 41:
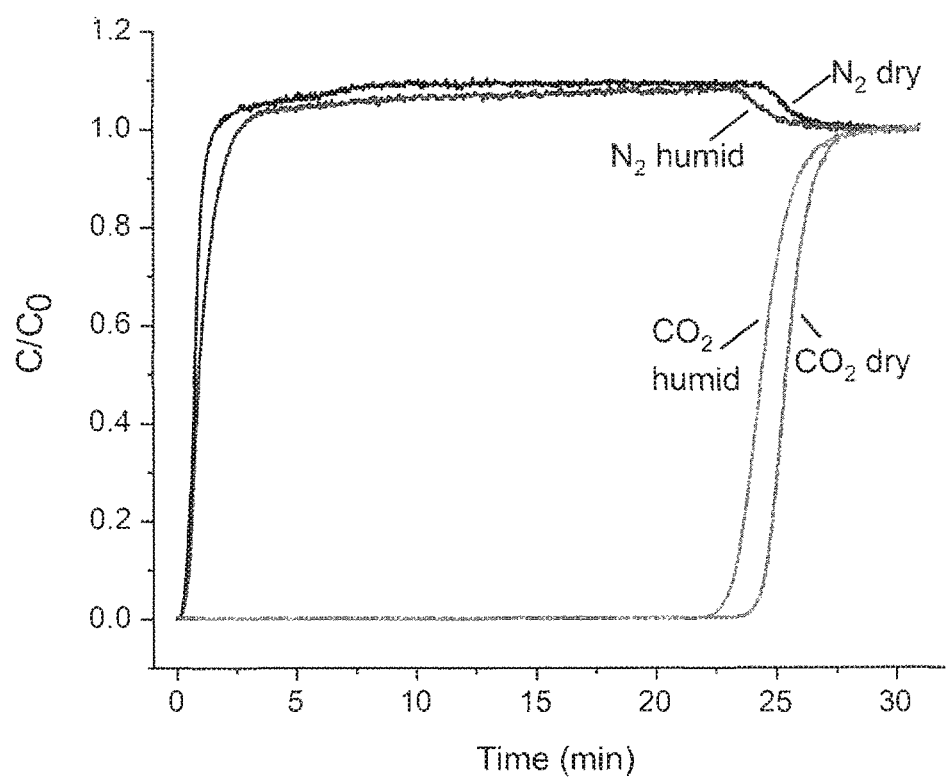
FIG. 41 shows experimental breakthrough curves for a mixture of $CO_2/N_2$ (15/85) at 27° C. with and without water vapour. The water vapour is present at 82% relative humidity.

The ability of the MOF to capture $CO_2$ from gas mixtures is unaffected by the presence of water vapour in the gas mixture. FIG. 41 shows a breakthrough curve for a mixture of $CO_2$ and $N_2$ (15/85) at 27° C. in the presence of water vapour (82% relative humidity) compared to the same gas mixture without water vapour, and demonstrates that MUF-16 efficiently retains $CO_2$ and delivers pure $N_2$ in the presence of water.

Pelletisation/Incorporation into Other Materials

Incorporation of the MOF of the present invention into other materials improves the handling of the MOF and widens the potential uses for their gas capture properties. These components may include materials such as, but not limited to, polymers, biomolecules, resins, ceramics, carbon (e.g. activated carbon) and inorganic oxides. The composite material may take the form, for example, of a pellet, membrane, sheet, or monolith. For example, the MOF may be combined with further components to form a membrane, such as gas separation membranes.

Figure 42:
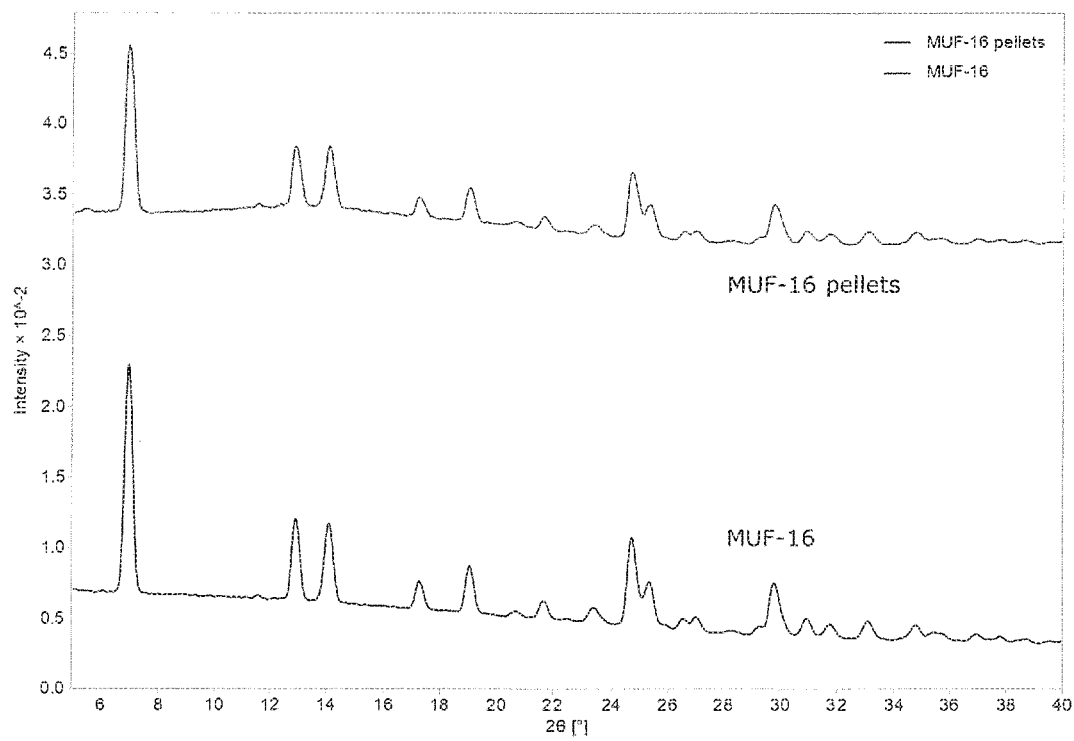
FIG. 42 shows PXRD patterns of MUF-16 showing that its structure remains unchanged after making it into pellet with a PVDF binder.
Figure 43:
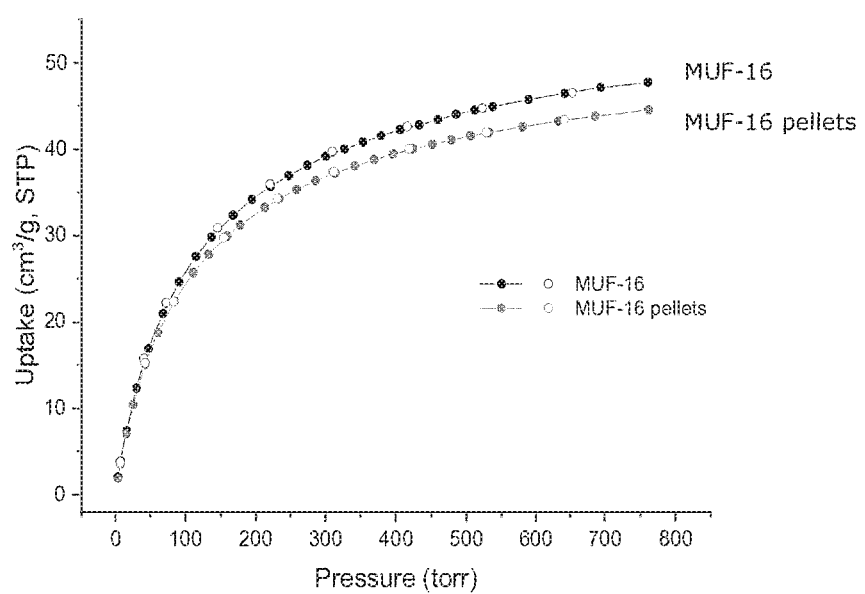
FIG. 43 shows $CO_2$ adsorption isotherm of MUF-16 at 293 K showing that the inherent adsorption performance of the MOF toward $CO_2$ remains unchanged after making it into pellet with a PVDF binder. The observed drop in capacity for the pellets arises from the 5 wt % PVDF, which is non-adsorbing.
Figure 44:
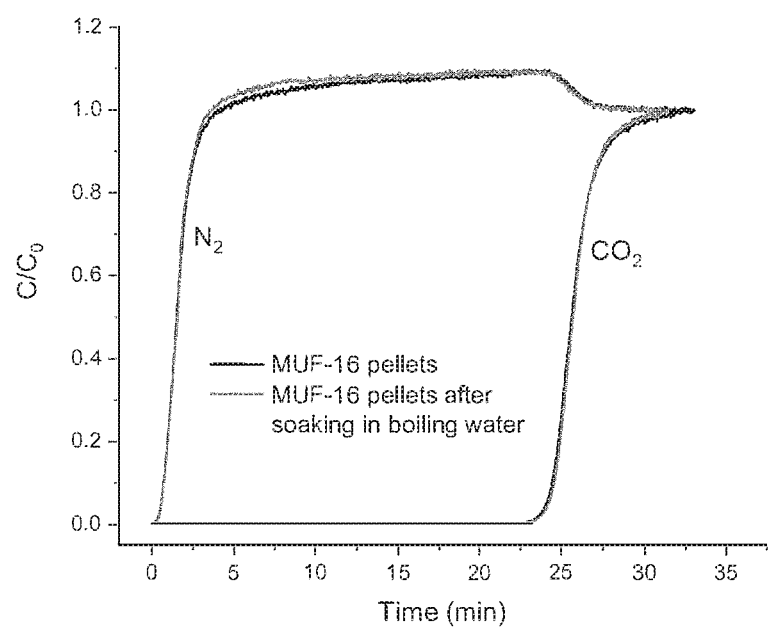
FIG. 44 shows experimental breakthrough curves for a mixture of $CO_2/N_2$ 15/85 at 293 K and 1.1 bar in an adsorption column packed with MUF-16/PVDF pellets before and after being soaked in boiling water.

As an additional measure to render the MOF more compatible with typical large-scale gas separation processes, Example 8 describes the incorporation of a MOF of the present invention into a composite. MUF-16 was combined with a quantity of polyvinylidene fluoride (PVDF) to make composite pellets. The PXRD profile of the pellets comprising MUF-16 was substantially the same as the profile for MUF-16, indicating that the crystalline structure of the material is preserved on the molecular scale (see FIG. 42). The pellets exhibit the same adsorption profile as MUF-16, showing that the gas adsorption characteristics are unchanged. For example, FIG. 43 shows that MUF-16/PVDF exhibits the same $CO_2$ adsorption isotherms compared to MUF-16 (the observed drop in capacity for the PVDF pellets arises from the 5 wt % PVDF, which is non-adsorbing). The pellets maintain the stability and robustness observed for MUF-16, as shown by FIG. 44 which illustrates that the pellets retain their $CO_2/N_2$ separation performance even after the pellets are soaked in boiling water.

EXAMPLES

All starting compounds and solvents were used as received from commercial sources without further purification unless otherwise noted.

Example 1: Preparation of MUF-16, MUF-16(Mn), and MUF-16(Ni)

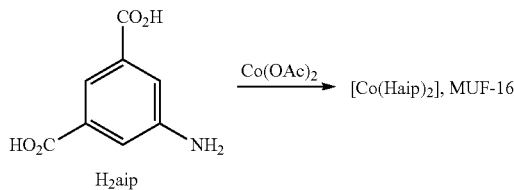

H₂aip

Synthesis of MUF-16:

A mixture of $Co(OAc)_2 \cdot 4H_2O$ (0.625 g, 2.5 mmol), 5-aminoisophthalic acid (1.8 g, 10 mmol), methanol (80 mL) and water (5 ml) were sonicated for 20 min in a sealed 1000 mL Schott bottle, which was then heated in a pre-heated oven at 70° C. for 2 hours under autogenous pressure.

After cooling the oven to room temperature, the resulting pink crystals were isolated by decanting off the mother liquor, then washed with methanol several times and dried under vacuum at 130° C. for 20 h. Yield: 0.98 g (94% based on cobalt) of guest-free MUF-16.

Alternative Synthesis of MUF-16:

A mixture of $Co(OAc)_2 \cdot 4H_2O$ (5.0 g, 20 mmol), 5-aminoisophthalic acid (12 g, 68 mmol), methanol (490 mL) and water (40 ml) were sonicated for 20 min in a sealed 2000 mL Schott bottle, which was partly (~20%) prefilled with glass beads. The bottle was then heated in a pre-heated oven at 70° C. for 5 hours under autogenous pressure. After cooling the oven to room temperature, the resulting pink crystals were isolated by decanting off the mother liquor, washed with methanol several times and dried under vacuum at 130° C. for 20 h. Yield: 7.8 g (92% based on cobalt) of guest-free MUF-16.

Synthesis of MUF-16(Mn) and MUF-16(Ni)

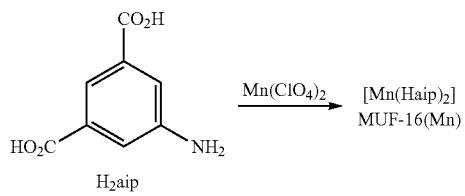

H₂aip

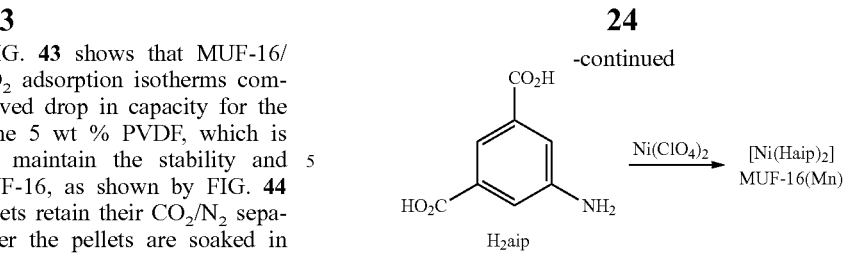

H₂aip

A mixture of $M(ClO_4)_2 \cdot 6H_2O$ (where M=Mn or Ni) (1.25 mmol), 5-aminoisophthalic acid (2.50 mmol, 0.45 g), and $NH_4NO_3$ (2.50 mmol, 0.20 g) with a mixed-solvent of $CH_3CN$ (20 mL) and $CH_3OH$ (15 mL) were sonicated for 20 min and sealed in a 100 mL Teflon-lined stainless-steel reaction vessel and heated at 160° C. for two days under autogenous pressure. After cooling the oven to room temperature, the resulting brownish crystals were isolated by decanting off the mother liquor, washed with methanol several times and dried under vacuum at 130° C. for 20 h. Yields: 0.21 g (40% based on Mn) of guest free MUF-16 (Mn), and 0.28 g (53% based on Ni) of guest-free MUF-16 (Ni).

Example 2: Structural Characterisation

Single crystal X-ray diffraction characterisation of MUF-16, Mn and Ni analogues was performed using a Rigaku Spider diffractometer equipped with a MicroMax MM007 rotating anode generator ($Cu_\alpha$ radiation, 1.54180 Å), high-flux Osmic multilayer mirror optics, and a curved image plate detector was used to collect SCXRD and PXRD data.

MOF crystals were analysed after washing with methanol. Room temperature data collections produced better refinement statistics than low temperature data collections. All atoms were found in the electron density difference map.

All atoms were refined anisotropically, except hydrogen atoms and certain atoms of the water molecules in the pores. A solvent mask was calculated for MUF-16(Ni) and 124 electrons were found in a volume of 308 Å$^3$ in 1 void per unit cell. This is consistent with the presence of three disordered water molecules per asymmetric unit, which account for 120 electrons per unit cell.

The SCXRD data were integrated, scaled and averaged with FS Process Rigaku (Rigaku Corporation: Tokyo, J., 1996). SHELX,[16] under OLEX[17], was used for structure solution and refinement.

For PXRD measurements, unless otherwise noted, samples were kept damp with solvent prior to and during measurements. The two-dimensional images of the Debye rings were integrated with 2DP to give 2θ vs I diffractograms. The data were obtained from freshly prepared MOF samples that had been washed several times with methanol. Predicted powder patterns were generated from single crystal structures using Mercury™.

TABLE 1

Crystal data and structure refinement details for MUF-16, MUF-16(Mn), and MUF-16(Ni).

| | MUF-16 (M = Co) | MUF16(Mn), (M = Mn) | MUF-16(Ni). (M = Ni) |
|---|---|---|---|
| Formula | Co(Haip)$_2$•2H$_2$O | Mn(Haip)$_2$•3H$_2$O | Ni(Haip)$_2$•3H$_2$O |
| Empirical formula | C$_{16}$H$_{16}$CoN$_2$O$_{10}$ | C$_{16}$H$_{18}$MnN$_2$O$_{11}$ | C$_{16}$H$_{18}$N$_2$NiO$_{11}$ |
| Formula weight | 455.24 | 471.28 | 473.3 |
| Temperature/K | 292 | 292 | 293 |
| Crystal system | monoclinic | monoclinic | monoclinic |
| Space group | I2/a | I2/a | I2/a |
| a/Å | 15.3514(15) | 25.2367(14) | 15.4963(11) |
| b/Å | 4.4232(4) | 4.57990(10) | 4.5780(2) |
| c/Å | 25.614(4) | 15.4895(11) | 25.230(2) |
| α/° | 90 | 90 | 90 |
| β/° | 94.294(10) | 96.046(8) | 96.177(8) |
| γ/° | 90 | 90 | 90 |
| Volume /Å$^3$ | 1734.4(4) | 1780.34(17) | 1779.5(2) |
| Z | 4 | 4 | 4 |
| $\rho_{calc}$/g cm$^{-3}$ | 1.743 | 1.758 | 1.564 |
| μ/mm$^{-1}$ | 8.357 | 6.682 | 2.02 |
| F(000) | 932 | 972 | 856 |
| Resolution range for data/Å | 0.81 | 0.81 | 1 |
| Reflections collected | 7472 | 14132 | 6610 |
| Independent reflections | 1594 [R$_{int}$ = 0.0918, R$_{sigma}$ = 0.0917] | 1668 [R$_{int}$ = 0.1054, R$_{sigma}$ = 0.1158] | 925 [R$_{int}$ = 0.0917, R$_{sigma}$ = 0.0852] |
| Data/restraints/parameters | 1594/2/136 | 1668/1/149 | 925/0/126 |
| Goodness-of-fit on F2 | 1.301 | 1.152 | 1.649 |
| Final R indices [I > 2σ(I)] | R$_1$ = 0.1185, wR$_2$ = 0.3035 | R$_1$ = 0.0740, wR$_2$ = 0.1821 | R$_1$ = 0.1517, wR$_2$ = 0.3672 |
| Final R indices [all data] | R$_1$ = 0.1576, wR$_2$ = 0.3785 | R$_1$ = 0.1350, wR$_2$ = 0.2421 | R$_1$ = 0.2061, wR$_2$ = 0.4467 |
| Largest diff, peak/hole/eÅ$^{-3}$ | 0.93/-1.26 | 0.57/-0.51 | 0.77/-0.83 |

The MOF of the present invention was characterized with SCXRD in a glass capillary both under vacuum and loaded with CO$_2$ (about 1.1 bar). SCXRD data for MUF-16(Mn) under vacuum and loaded with CO$_2$ is shown in Table 2.

TABLE 2

SCXRD data and refinement details of guest-free and CO$_2$-loaded MUF-16(Mn)

| | MUF-16(Mn) in vacuo | CO$_2$-loaded MUF-16(Mn) |
|---|---|---|
| Formula | Mn(Haip)$_2$ | Mn(Haip)$_2$•CO$_2$ |
| Empirical formula | C$_{16}$H$_{12}$MnN$_2$O$_8$ | C$_{17}$H$_{12}$MnN$_2$O$_{10}$ |
| Formula weight | 415.22 | 459.23 |
| Temperature/K | 292 | 292 |
| Crystal system | monoclinic | monoclinic |
| Space group | I2/a | I2/a |
| a/Å | 15.4872(11) | 15.5719(10) |
| b/Å | 4.51930(10) | 4.52010(10) |
| c/Å | 25.4913(13) | 25.438(2) |
| α/° | 90 | 90 |
| β/° | 97.080(16) | 97.108(8) |
| γ/° | 90 | 90 |
| Volume /Å$^3$ | 1770.56(17) | 1776.7(2) |
| Z | 4 | 4 |
| $\rho_{calc}$/g cm$^{-3}$ | 1.558 | 1.717 |
| μ/mm$^{-1}$ | 6.512 | 6.646 |
| F(000) | 844.0 | 932.0 |
| Data range for refinement/Å | 0.90 | 1.08 |
| Reflections collected/ind. | 7515/1214 [R$_{int}$ = 0.1632, R$_\square$ = 0.1964] | 8177/713 [R$_{int}$ = 0.1104, R$_\square$ = 0.0804] |
| Data/restraints/parameters | 1214/0/129 | 713/90/136 |
| Goodness-of-fit on F$^2$ | 0.862 | 1.216 |
| Final R indexes [I > 2σ(I)] | R$_1$ = 0.0510, wR$_2$ = 0.0954 | R$_1$ = 0.0868, wR$_2$ = 0.2280 |
| Final R indexes [all data] | R$_1$ = 0.1341, wR$_2$ = 0.1112 | R$_1$ = 0.1278, wR$_2$ = 0.2915 |
| Largest diff, peak/hole/eÅ$^{-3}$ | 0.35/-0.48 | 0.56/-0.58 |

Example 3: Uptake—Adsorption/Desorption Isotherms

Unless otherwise stated, CO$_2$ adsorption isotherms were collected at 293 K. The isotherms rise steeply at low pressures and nearly plateau towards 1 bar, which indicates a strong affinity of the frameworks for the CO$_2$ guests.

The as-synthesized samples were washed with anhydrous methanol several times and 50-1000 mg was transferred into a pre-dried and weighed sample tube. Large sample quantities were used to measure isotherms of the weakly-adsorbing gases to ensure reliable results. To activate the sample, it was heated at rate of 10° C./min to a temperature of 130° C. under a dynamic vacuum with a turbomolecular pump for 20 hours.

A CO$_2$ adsorption isotherm at 77 K established the permanent porosity of MUF-16 and gave a BET surface area of 215 m$^2$/g and a pore volume of 0.11 cm$^3$/g (Table 3).[18] Similar results for MUF-16(Mn) and MUF-16(Ni) are shown in Table 3. These values are consistent with the geometric surface area of about 310 m$^2$/g and pore volume of 0.1 cm$^3$/g calculated from the crystallographic coordinates.

The isosteric heat of adsorption (Q$_{st}$) of CO$_2$ was calculated by the implementation of virial method.[19] The isosteric heat of adsorption ($Q_{st}$) at zero-coverage was calculated to be around 33-37 kJ/mol (see Table 5), increasing at higher loadings which is consistent with gradual expansion of network structure (energy consumed) during adsorption.

TABLE 3

Calculated and experimentally determined properties of the MUF-16 family.

| | MUF-16 | MUF-16 (Mn) | MUF-16 (Ni) |
|---|---|---|---|
| Geometric surface area (m²/g, Zeo++) | 313 | 315 | 313 |
| BET surface area (m²/g, from experimental $N_2$ isotherm/77 K) | 215 | 209 | 238 |
| Calculated void fraction (%, RASPA2) | 17.3 | 17.0 | 16.7 |
| Calculated pore volume (cm³/g, RASPA2) | 0.10 | 0.11 | 0.11 |
| Pore volume (cm³/g, from experimental $N_2$ isotherm/77 K) | 0.11 | 0.12 | 0.11 |
| Largest cavity diameter (Å) | 3.63 | 3.58 | 3.61 |
| Pore limiting diameter (Å) | 2.95 | 2.95 | 2.96 |

TABLE 4

Uptake capacity of $CO_2$ at 293 K and 1 bar of MUF-16.

| | Uptake (wt%) |
|---|---|
| MUF-16 | 9.38 |
| MUF-16(Ni) | 9.41 |
| MUF-16(Mn) | 9.90 |

TABLE 5

Metrics relevant to $CO_2/N_2/CH_4$ separations for MUF-16 (293 K, 1 bar)

| Material | $CO_2$ \| $N_2$ \| $CH_4$ uptakes (cc/g) | $Q_{st}$ ($CO_2$) (kJ/mol) | Uptake ratio $CO_2/N_2$ | Uptake ratio $CO_2/CH_4$ | IAST selectivity $CO_2/N_2$ (15/85) | IAST selectivity $CO_2/CH_4$ (50/50) | IAST selectivity $CO_2/H_2$ (20/80) |
|---|---|---|---|---|---|---|---|
| MUF-16 | 47.8 \| 1.3 \| 1.2 | 33 | 36.2 | 39.8 | 631 | 6686 | 9695 |
| MUF-16 (Mn) | 50.5 \| 2.9 \| 3.1 | 38 | 17.6 | 16.3 | 256 | 470 | 301 |
| MUF-16 (Ni) | 48.0 \| 2.3 \| 2.8 | 37 | 20.8 | 17.3 | 281 | 1215 | 6828 |

Example 4: IAST Selectivity

Mixed gas adsorption isotherms and gas selectivities for different mixtures of $CO_2/C_2H_2$, $CO_2/C_2H_4$, $CO_2/C_2H_6$, $CO_2/N_2$, $CO_2/CH_4$ and $CO_2/H_2$ at 293 K were calculated based on the ideal adsorbed solution theory (IAST) proposed by Myers and Prausnitz.[20] The pyIAST package was used to perform the IAST calculations.[21] In order to predict the sorption performance of MUF-16 toward the separation of binary mixed gases, the single-component adsorption isotherms were first fit to a Dual Site Langmuir or Dual Site Langmuir Freundlich model as below:

$$q = \frac{q_1 b_1 P}{1 + b_1 P} + \frac{q_2 b_2 P}{1 + b_2 P}$$

$$q = \frac{q_1 b_1 P^{1/t_1}}{1 + b_1 P^{1/t_1}} + \frac{q_2 b_2 P^{1/t_2}}{1 + b_2 P^{1/t_2}}$$

Where q is the uptake of a gas; P is the equilibrium pressure and $q_1$, $b_1$, $t_1$, $q_2$, $b_2$ and $t_2$ are constants. These parameters were used subsequently to carry out the IAST calculations.

A summary of the gas adsorption data and IAST-calculated selectivities for the MUF-16 family is provided in Table 6.

TABLE 6

Summary of gas adsorption data and IAST-calculated selectivities for the MUF-16 family at 1 bar and 293 K.

| | Gas(es) | MUF-16 (M = Co) | MUF-16(Mn) (M = Mn) | MUF-16(Ni) (M = Ni) |
|---|---|---|---|---|
| Uptake[a] | $CO_2$ | 47.78 | 50.5 | 47.97 |
| | $N_2$ | 1.32 | 2.86 | 2.30 |
| | $CH_4$ | 1.20 | 3.10 | 2.77 |
| | $H_2$ | 0.64 | 1.10 | 0.78 |
| | $C_2H_2$ | 3.99 | 9.69 | 7.53 |
| | $C_2H_4$ | 3.17 | 8.31 | 5.42 |
| | $C_2H_6$ | 3.06 | 8.81 | 5.67 |
| | $C_3H_6$ | 5.35 | — | — |
| | $C_3H_8$ | 4.82 | — | — |
| Selectivity | $CO_2/N_2$[b] | 630 | 260 | 280 |
| | $CO_2/CH_4$[c] | 6690 | 470 | 1220 |
| | $CO_2/H_2$[d] | 9690 | 300 | 6830 |
| | $CO_2/C_2H_2$[c] | 510 | 31 | 46 |
| | $CO_2/C_2H_4$[c] | 600 | 150 | 130 |
| | $CO_2/C_2H_6$[c] | 600 | 55 | 110 |
| | $CO_2/C_3H_6$[c] | 260 | — | — |
| | $CO_2/C_3H_8$[c] | 84 | — | — |

[a] In cm³/g.
[b] 15/85 ratio at 1 bar and 293 K as calculated by IAST.
[c] 50/50 ratio at 1 bar and 293 K as calculated by IAST.
[d] 20/80 ratio at 1 bar and 293 K as calculated by IAST.

Example 5: Breakthrough Testing

Figure 25:
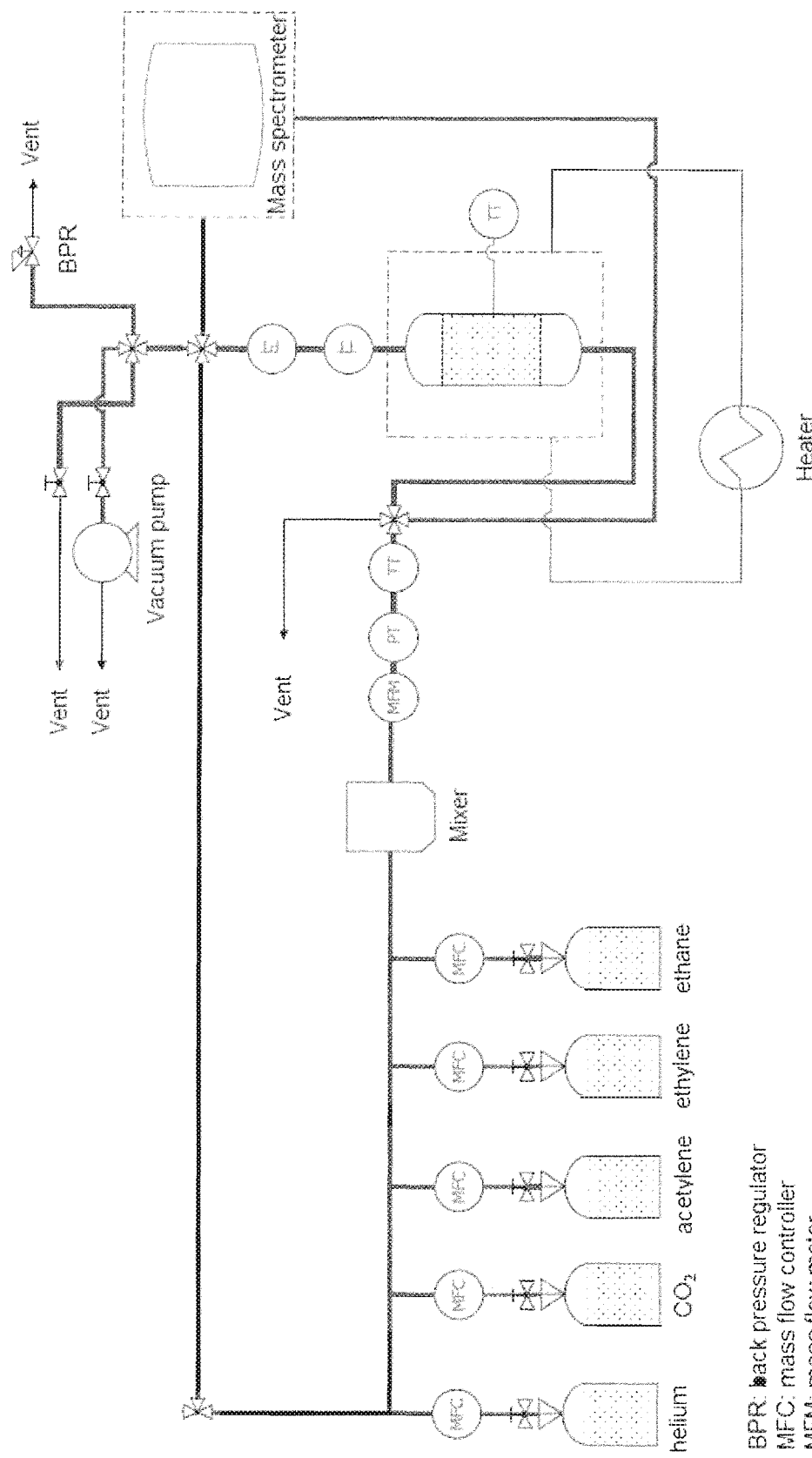
FIG. 25 shows a breakthrough apparatus used to measure the gas separation performance of the MOFs under dynamic conditions.
Figure 26:
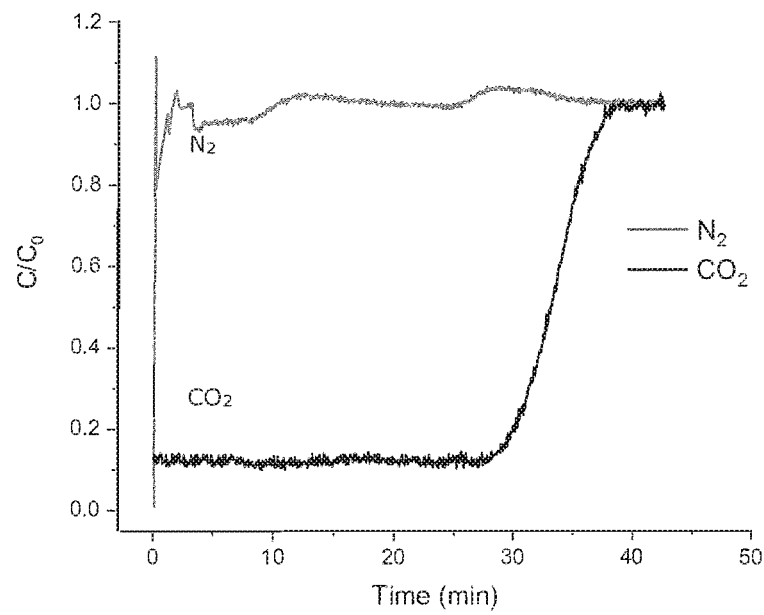
FIG. 26 shows experimental breakthrough curves for a mixture of 0.4/99.6 $CO_2/N_2$ at 1.1 bar and 293 K in an adsorption column packed with MUF-16.
Figure 27:
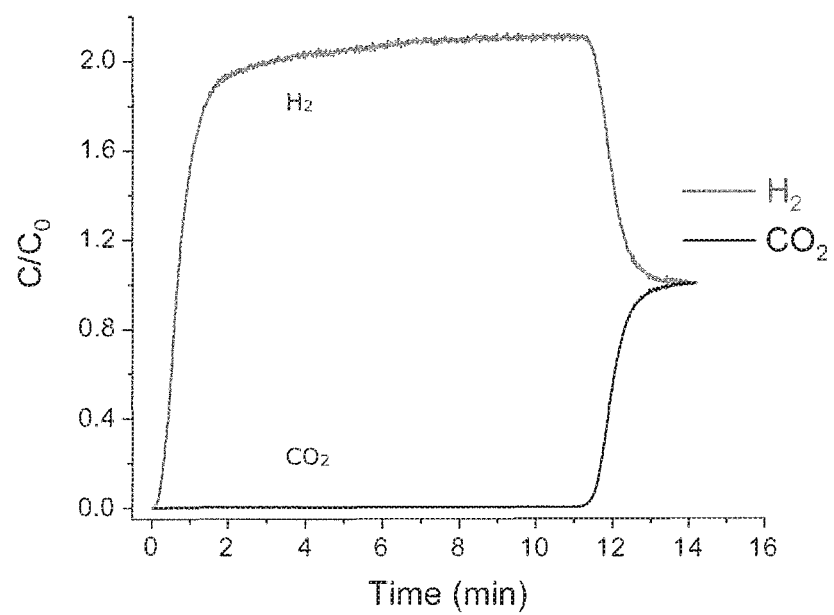
FIG. 27 shows experimental breakthrough curves for a mixture of 50/50 $CO_2/H_2$ at 1.1 bar and 293 K in an adsorption column packed with MUF-16.
Figure 28:
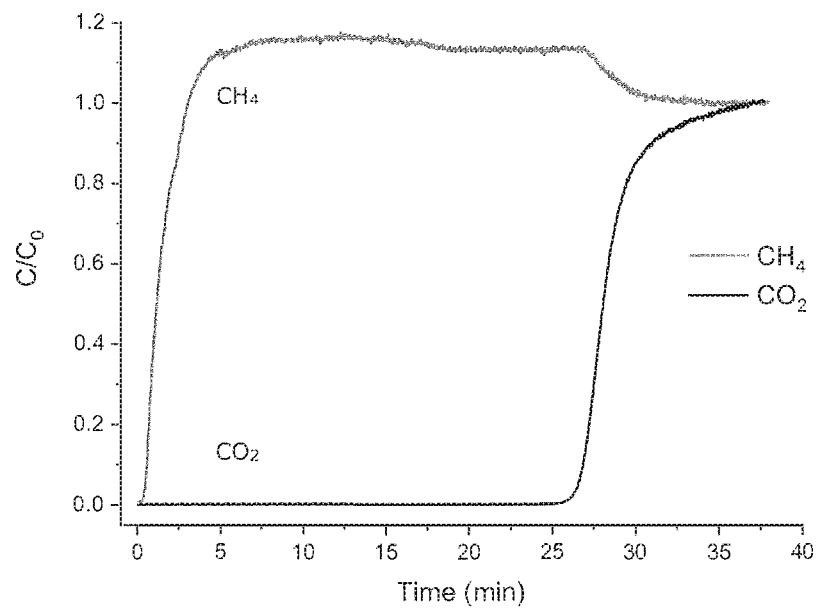
FIG. 28 shows experimental breakthrough curves for a mixture of 15/85 $CO_2/CH_4$ at 1.1 bar and 293 K in an adsorption column packed with MUF-16.
Figure 29:
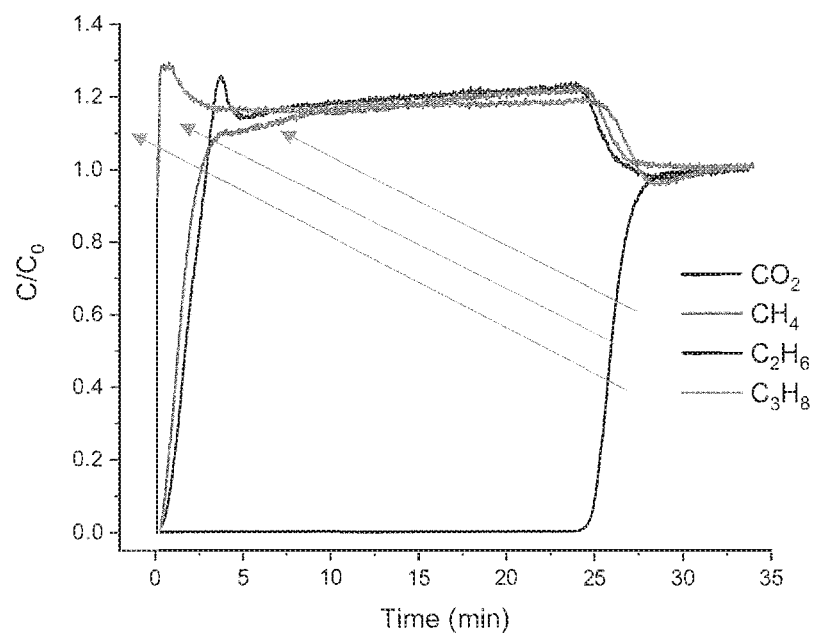
FIG. 29 shows experimental breakthrough curves for a mixture of 15/80/4/1 $CO_2/CH_4/C_2H_6/C_3H_8$ at 1.1 bar and 293 K in an adsorption column packed with MUF-16.
Figure 30:
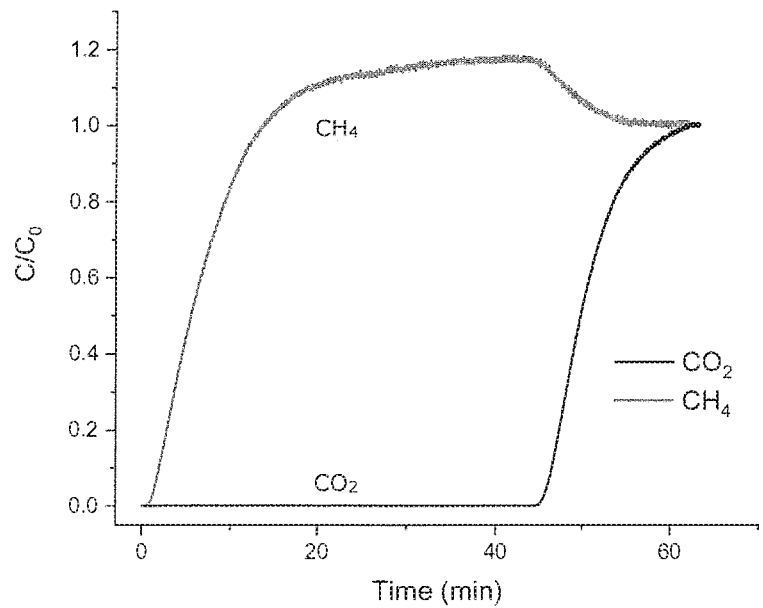
FIG. 30 shows experimental breakthrough curves for a mixture of 15/85 $CO_2/CH_4$ at 9 bar and 293 K in an adsorption column packed with MUF-16.
Figure 31:
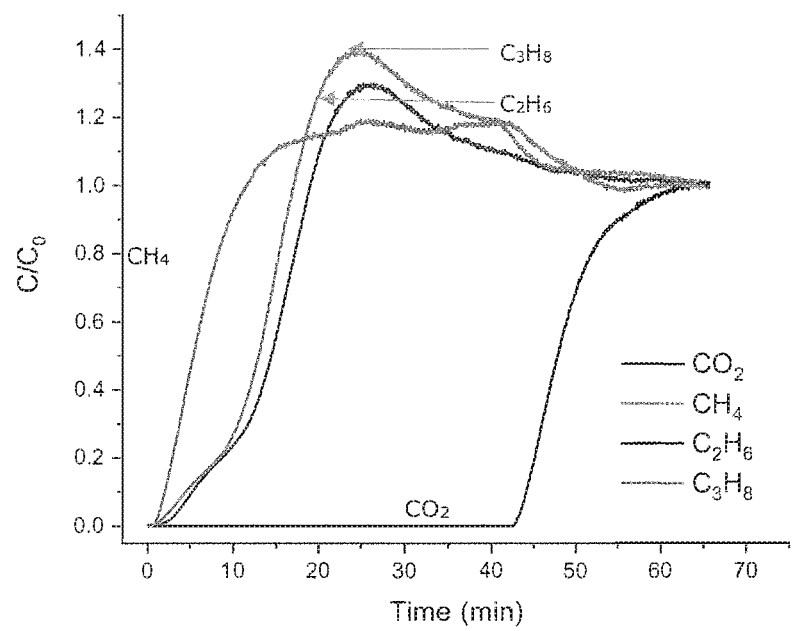
FIG. 31 shows experimental breakthrough curves for a mixture of 15/80/4/1 $CO_2/CH_4/C_2H_6/C_3H_8$ at 9 bar and 293 K in an adsorption column packed with MUF-16.
Figure 32:
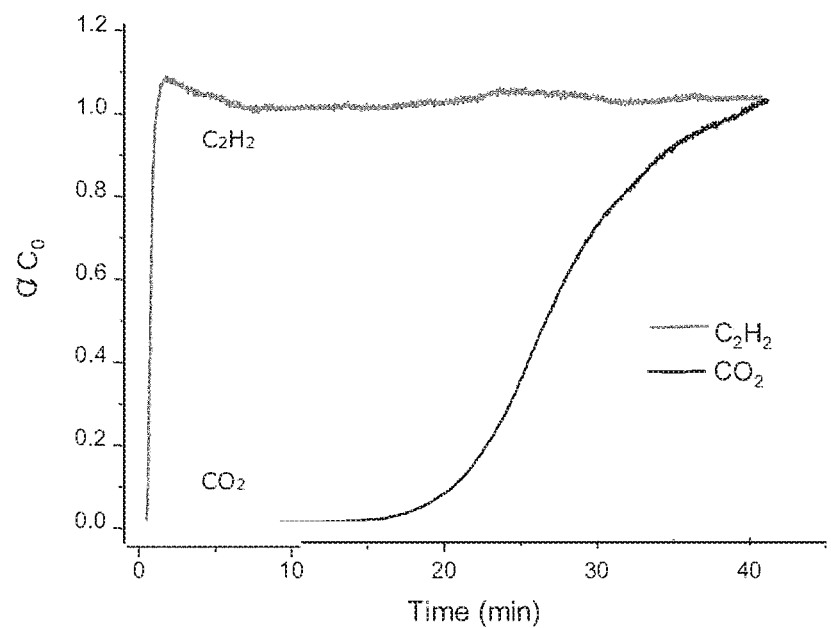
FIG. 32 shows experimental breakthrough curves for a mixture of 5/95 $CO_2/C_2H_2$ at 1.1 bar and 293 K in an adsorption column packed with MUF-16
Figure 33:
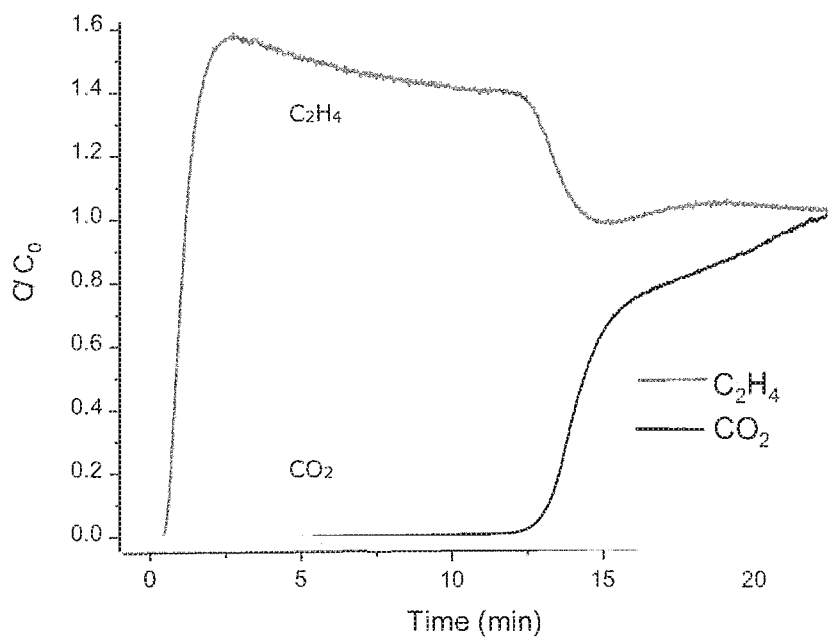
FIG. 33 shows experimental breakthrough curves for a mixture of 50/50 $CO_2/C_2H_4$ at 1.1 bar and 293 K in an adsorption column packed with MUF-16.
Figure 34:
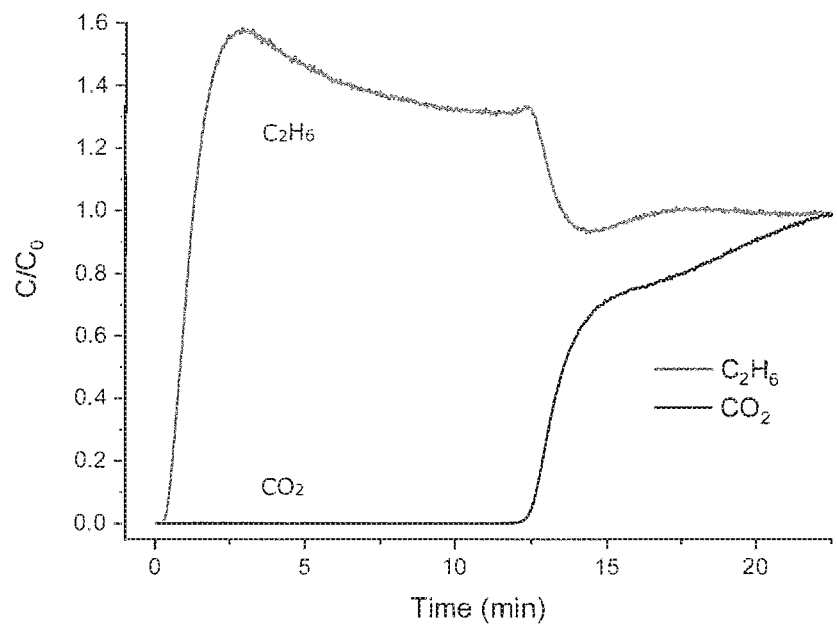
FIG. 34 shows experimental breakthrough curves for a mixture of 50/50 $CO_2/C_2H_6$ at 1.1 bar and 293 K in an adsorption column packed with MUF-16.

The feasibility of $CO_2$ separations under dynamic condition using the MOF of the present invention was investigated using an adsorption bed in a breakthrough apparatus in accordance with the apparatus shown in FIG. 25.

In a typical breakthrough experiment, activated MUF-16 (0.9 g) was placed in an adsorption column (6.4 mm in diameter×11 cm in length) to form a fixed bed. The adsorbent was activated at 130° C. under high vacuum for 7 hours and then the column was left under vacuum for another 3 hours while being cooled to 20° C. The column was then purged under a 20 $mL_N$/min flow of He gas for 1 hr at 1.1 bar prior to the breakthrough experiment.

Gas mixtures of $CO_2/N_2$, $CO_2/CH_4$, $CO_2/H_2$ and $CO_2/CH_4+C_2H_6+C_3H_8$ in varying proportions were introduced to the column at 1.1 bar (and 9 bar for $CO_2/CH_4$ and $CO_2/CH_4+C_2H_6+C_3H_8$) and 20° C.

A feed flowrate of 6 $mL_N$/min was set (10 $mL_N$/min for 0.4/99.6 $CO_2/N_2$ mixture, and 6.85 $mL_N$/min for 5/95 mixture of $CO_2/C_2H_2$). The operating pressure was controlled at 1.1 or 9 bar with a back-pressure regulator. The flowrate of He in the feed was kept constant at 2 $mL_N$/min for all the experiments unless otherwise stated. The outlet composition was continuously monitored by a SRS UGA200 mass spectrometer. The $CO_2$ was deemed to have broken through from the column when its concentration reached 600 ppmv.

The adsorbates (primarily $CO_2$) were stripped from the column to regenerate the adsorbent by purging with dry air at ambient temperature (20° C.) and a flow rate of 20 $mL_N$/min at 1.1 bar. The effluent from the adsorption bed was monitored by mass spectrometry to show that all of the $CO_2$ was removed at 20° C. over a period of around 25 minutes, with no further loss of $CO_2$ observed at 40, 60, 80 or 130° C.

Experimental breakthrough separation test results are summarised in Table 9.

Simulated breakthrough experiments were performed to investigate separations at low $CO_2$ concentrations, such as trace concentrations. First, the mass transfer coefficient used for the simulated breakthrough curves was empirically tuned based on experimental breakthrough curves. This produced a match between simulated and experimental breakthrough curves. Using this mass transfer coefficient, breakthrough curves were predicted for feed compositions of 0.1/99.9 $CO_2$/C2 hydrocarbons at 1.1 bar and 293 K. FIG. 35 shows the simulated breakthrough curve of 0.1/99.9 $CO_2/C_2H_2$. Simulated breakthrough curves for $C_2H_4$ and $C_2H_6$ are substantially identical. These calculations revealed MUF-16 is capable of eliminating trace quantities of $CO_2$ from C2 hydrocarbons.

The simulation of breakthrough curves was carried out using a previously reported method.[22] A value for the mass transfer coefficient (k) was obtained by empirical tuning the steepness of the predicted breakthrough curves to match the experimental curve. The mass transfer coefficient tuned in this way was later used to predict breakthrough curves for other feed mixtures and operating pressures. A summary of adsorption column parameters and feed characterizations are presented in Table 7. The simulation of breakthrough curves for $CO_2$/C2 hydrocarbons was carried out using the method reported above. A summary of adsorption column parameters and feed characterizations are presented in Table 8.

TABLE 7

Adsorption column parameters and feed characterizations used for the simulations for MUF-16.

Adsorption bed

Length: 110 mm
Diameter: 6.4 mm
Amount of adsorbent in the bed: 0.9 g
Adsorbent density: 1.674 g/cm$^3$
Adsorbent average radius: 0.2 mm
$k_{CO2}$: 0.029 s$^{-1}$
$K_{CH4}$: 0.00021 s$^{-1}$ Feed Flow rate: 6 $mL_N$/min
Temperature: 293 K
Pressure: 1.1 bar
Carrier gas flow rate:
No carrier gas was used

TABLE 8

Adsorption column parameters and feed characterizations used for the simulations

| Adsorption bed | Feed |
|---|---|
| Length: 110 mm | Flow rates: |
| Diameter: 6.4 mm | 6 $mL_N$/min for equimolar and 0.1/99.9 mixtures, and 6.85 |
| Amount of adsorbent in the bed: 0.9 g | $mL_N$/min for the 5/95 mixture. |
| Bed voidage: 0.84 | Temperature: 293 K |
| Adsorbent average radius: 0.2 mm | Pressure: 1.1 bar |
| $k_{CO2}$: 0.021 s$^{-1}$ | Carrier gas (He) flow rate: |
| $k_{C2H2}$: 0.024 s$^{-1}$ | 2 $mL_N$/min. |

Example 6: Regeneration of the Adsorbent

The adsorption bed used in Example 5 was subsequently regenerated by purging with with a flow of air, and the breakthrough experiment was repeated. As shown in FIG. 37, breakthrough curves were substantially unchanged after 200 exposure/purge cycles of exposure to a $CO_2/N_2$ 15/85 gas mixture (6 mL/min).

TABLE 9

Summary of inlet gas feed streams, outlet compositions and associated data for experimental breakthrough tests using a MUF-16 adsorbent bed.

| Gas mixture | Total pressure (bar) | Inlet $CO_2$ partial pressure (bar) | Flowrate ($mL_N$/min) | Upper limit for $CO_2$ concentration in effluent (ppmv) | Breakthrough point of $CO_2$ (min) | $CO_2$ concentration in effluent at breakthrough point (ppmv) | Dynamic adsorption capacity (mmol/g) | Equilibrium adsorption capacity (mmol/g) |
|---|---|---|---|---|---|---|---|---|
| $CO_2/N_2$ (50/50) | 1 | 0.5 | 6 | 500 | 10.6 | 600 | 1.57 | 1.85 |
| $CO_2/N_2$ (15/85) | 1 | 0.15 | 6 | 520 | 24.1 | 600 | 1.08 | 1.23 |
| $CO_2/N_2$ (1/99) | 1 | 0.01 | 6 | 530 | 40.7 | 600 | 0.12 | 0.17 |
| $CO_2/N_2$ (0.4/99.6) | 1 | 0.004 | 10 | 500 | 28.5 | 600 | 0.06 | 0.09 |

TABLE 9-continued

Summary of inlet gas feed streams, outlet compositions and associated data for experimental breakthrough tests using a MUF-16 adsorbent bed.

| Gas mixture | Total pressure (bar) | Inlet $CO_2$ partial pressure (bar) | Flowrate ($mL_N$/min) | Upper limit for $CO_2$ concentration in effluent (ppmv) | Breakthrough point of $CO_2$ (min) | $CO_2$ concentration in effluent at breakthrough point (ppmv) | Dynamic adsorption capacity (mmol/g) | Equilibrium adsorption capacity (mmol/g) |
|---|---|---|---|---|---|---|---|---|
| $CO_2/CH_4$ (50/50) | 1 | 0.5 | 6 | 500 | 10.6 | 600 | 1.53 | 1.85 |
| $CO_2/CH_4$ (15/85) | 1 | 0.15 | 6 | 520 | 25.6 | 600 | 1.13 | 1.23 |
| $CO_2/CH_4$ (15/85) | 9 | 0.15 | 6 | 360 | 44.8 | 600 | 2.01 | — |
| $CO_2/CH_4 + C_2H_6 + C_3H_8$ (15/80/4/1) | 1 | 0.15 | 6 | 520 | 24.6 | 600 | 1.09 | 1.23 |
| $CO_2/CH_4 + C_2H_6 + C_3H_8$ (15/80/4/1) | 9 | 0.15 | 6 | 390 | 42.5 | 600 | 1.93 | — |
| $CO_2/C_2H_2$ (50/50)* | 1 | 0.33 | 6 | 500 | 12.3 | 600 | 1.23 | 1.64 |
| $CO_2/C_2H_2$ (5/95) | 1 | 0.035 | 6.85 | 540 | 15.1 | 600 | 0.18 | 0.46 |
| $CO_2/C_2H_4$ (50/50)* | 1 | 0.33 | 6 | 500 | 11.9 | 600 | 1.19 | 1.64 |
| $CO_2/C_2H_6$ (50/50)* | 1 | 0.33 | 6 | 500 | 12.2 | 600 | 1.22 | 1.64 |
| $CO_2/H_2$ (50/50) | 1 | 0.5 | 6 | 500 | 10.8 | 600 | 1.62 | 1.85 |
| $CO_2/H_2$ (15/85) | 1 | 0.5 | 6 | 510 | 24.4 | 600 | 1.11 | 1.85 |

Example 7: Stability

Figure 39:
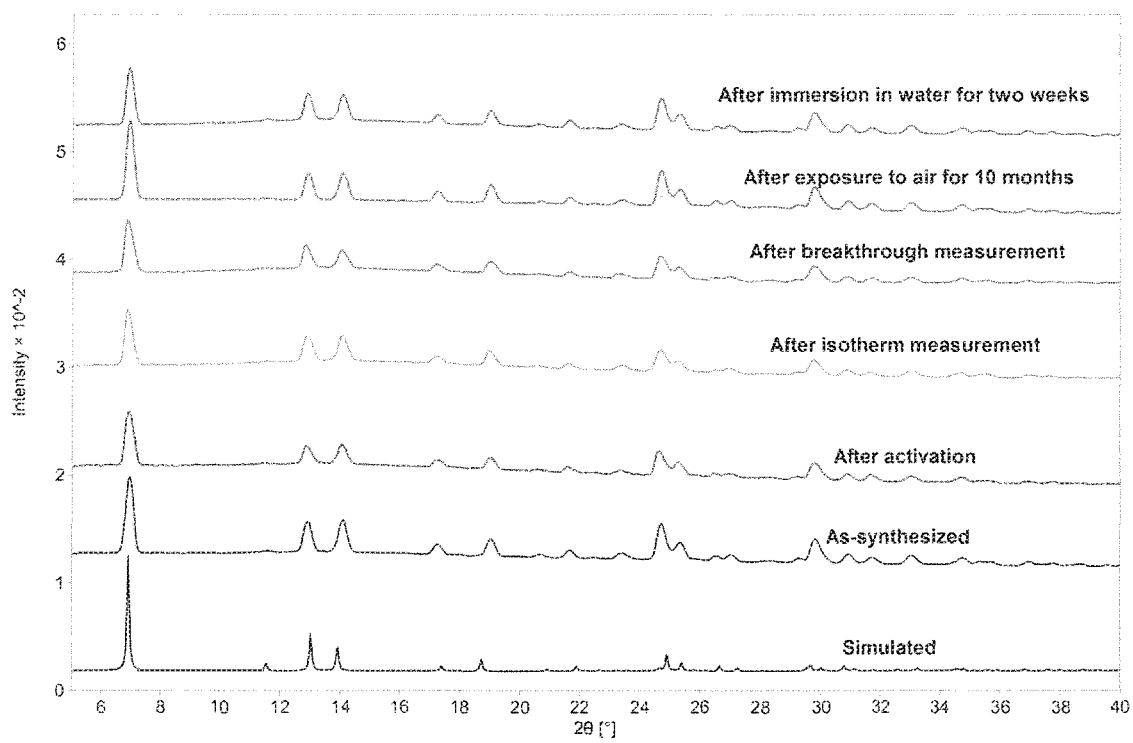
FIG. 39 shows PXRD patterns of MUF-16 showing that its structure remains unchanged after activation at 130° C. under vacuum, after isotherm measurements, after breakthrough experiments, after exposure to an air with relative humidity of >80% for at least 12 months and after immersion in water for two weeks.

Aging experiments of the MOFs of the present invention were performed as follows: as-synthesized samples were analysed with PXRD after washing several times with methanol, after activation at 130° C. under vacuum, after isotherm and breakthrough measurements (See Examples 3 and 5), after exposure to air at >80% relative humidity for 10 months, and after immersion in water for two weeks. Results are shown in FIG. 39.

Thermogravimetric analysis measurements were performed as follows: Freshly prepared MOF samples were washed with methanol, and then activated at 130° C. under vacuum for 10 hours. Samples were exposed to air for 1 hour and then transferred to an aluminium sample pan, and then TGA measurements were commenced under an $N_2$ flow with a heating rate of 5° C./min. Results of thermogravimetric analysis for MUF-16, MUF-16(Mn) and MUF-16(Ni) are shown in FIG. 40.

PXRD and isotherm measurements were performed according to the parameters described herein.

Example 8: Pelletisation

MUF-16 was incorporated into pellets using polyvinylidene difluoride (PVDF) as a binder according to the following method:
1. MUF-16 (~0.5 g) was gently ground using mortar and pestle.
2. The ground sample was transferred to a 20 ml vial and 0.5 ml of DMF was added. A viscous suspension was obtained after sonicating for half an hour. The suspension was stirred for another 30 mins.
3. PVDF powder (~50 mg) was gradually added over the course of 1 hour to make a viscus paste.
4. The paste was transferred into a plastic syringe using a spatula and pressed it out in one thin noodle onto a glass slide.
5. The noodle was cut into small pellets and dried under vacuum at 120° C. for 4 hours.

***

The inventions described and claimed herein have many attributes and embodiments including, but not limited to, those set forth or described or referenced in the Summary of the Invention. It is not intended to be all-inclusive and the inventions described and claimed herein are not limited to or by the features or examples identified in the Summary of the Invention, which is included for purposes of illustration only and not restriction.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification. The specific compositions and methods described herein are representative of preferred examples and are exemplary and not intended as limitations on the scope of the invention. Other aspects and examples will occur to those skilled in the art upon consideration of this specification, and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed as essential. Thus, for example, in each instance described or used herein, in embodiments or examples of the present invention, any of the terms "comprising", "consisting essentially of", and "consisting of" may be replaced with either of the other two terms in the specification. Also, the terms "comprising", "including", "containing", etc. are to be read expansively and without limitation. The assays and methods illustratively described herein suitably may be practiced in differing orders of steps, and that they are not necessarily restricted to the orders of steps indicated herein or in the claims. Further, as used or described herein and in the appended claims, the singular forms "a," "an," and "the" include plural reference unless the context clearly dictates otherwise. Under no circumstances may the patent be interpreted to be limited to the specific examples or embodiments or methods specifically disclosed herein.

The terms and expressions that have been employed are used as terms of description and not of limitation, and there is no intent in the use of such terms and expressions to exclude any equivalent of the features shown and described or portions thereof, but it is recognised that various modifications are possible within the scope of the invention as claimed. Thus, it will be understood that although the present invention has been specifically disclosed by preferred embodiments and optional features, modification and variation of the concepts disclosed herein may be resorted to by those skilled in the art, and that such modifications and variations are considered to be within the scope of this invention as described herein, and as defined by the appended claims.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein. Other embodiments are within the following claims.

REFERENCES

[1] Abbasi, T. & Abbasi, S. A., *Renew. Sus. Energ. Rev.* 15, 1828-1834, (2011).
[2] Rochelle, G. T., *Science* 325, 1652-1654 (2009).
[3] Yu, C.-H., Huang, C.-H. & Tan, C.-S., *Aerosol Air Qual. Res.* 12, 745-769 (2012).
[4] Oschatz, M. & Antonietti, M., *Energ. Environ. Sci.* 11, 57-70, (2018).
[5] Lin, R.-B., Xiang, S., Xing, H., Zhou, W., Chen, B., *Coord. Chem. Rev.* 2019, 378, 87-103.
[6] Li, H. et al., *EnergyChem* 2019, 1, 100006.
[7] Yaghi, O. M., et al., *Nature* 2003, 423, 705-714.
[8] Schoedel, A. et al., *Chem. Rev.*, 2016, 116, 12466-12535.
[9] Rufford, T. E. et al. *J. Petrol. Sci. Eng.* 2012, 94, 123-154.
[10] Myers, A. L., Prausnitz, J. M., *AIChE J.,* 1965, 11: 121-127; *Comput. Phys. Commun.* 2016, 200, 364.
[11] Hou, L. et al. *Chem. Commun.* 2011, 47, 5464-5466.
[12] Nugent, P. et al. *Nature* 2013, 495, 80-84.
[13] Scott, H. S. et al. *Chem. Sci.* 2016, 7, 5470-5476.
[14] McDonald, T. M. et al. *J. Am. Chem. Soc.* 2016, 134, 7056-7065.
[15] Moreau, F. et al. *Nat. Commun.* 2017, 8, 14085.
[16] Sheldrick, G. M. *Acta Cryst. A* 2008, 64, 112.
[17] Dolomanov, O. V.; Bourhis, L. J.; Gildea, R. J.; Howard, 3. A. K.; Puschmann, H. *J. Appl. Crystallogr.* 2009, 42, 339.
[18] Walton, K. S.; Snurr, R. Q., *J. Am. Chem. Soc.* 2007, 129, 8552-8558.
[19] Czepirski, L.; JagieŁŁo, J. *Chem. Eng. Sci.* 1989, 44, 797-801.
[20] Myers, A. L., Prausnitz, J. M., *AIChE J.,* 1965, 11, 121-127.
[21] Simon, C. M.; Smit, B., Haranczyk, M. *Comput. Phys. Commun.* 2016, 200, 364.
[22] Qazvini, O. T. et al., *J. Am. Chem. Soc.* 2019, 141, 12, 5014-5020; Qazvini, O. T. et al., *Chem. Mater.* 2019, 31 (13), 4919-4926.

The invention claimed is:

1. A method for the separation of carbon dioxide from a mixture, comprising contacting the mixture with a sorbent comprising a metal organic framework (MOF), wherein the MOF comprises:
a plurality of secondary building units (SBUs), each SBU comprising a repeating unit of one metal cation connected to another metal cation via a first moiety of an organic linker;
a layer of connected adjacent SBUs in which a second moiety of the linker in a first SBU is connected to a metal cation of an adjacent SBU, and
wherein adjacent layers are connected to each other via linker-to-linker bonding interactions; and
wherein each metal ion is selected from cobalt(II) ions, manganese(II) ions and nickel(II) ions, the organic linker is 5-aminoisophthalate, the first moiety is a carboxylate group and the second moiety is an amino group.

2. The method of claim 1, wherein the linker to linker bonding interactions are non-covalent.

3. The method of claim 1, wherein the linker to linker bonding interactions comprise hydrogen bonding interactions.

4. The method of claim 1, wherein the linker to linker bonding interactions comprise carboxyl-carboxyl bonding interactions.

5. The method of claim 1, wherein the mixture comprises anaesthetic gas, refrigerant or coolant gas, air, natural gas, liquefied petroleum gas, coal seam gas, syngas, flue gas, geothermal gas, or combinations thereof.

6. The method of claim 1, wherein the mixture comprises any of the following, or a combination thereof: hydrogen sulphide ($H_2S$), oxygen ($O_2$), nitrogen ($N_2$), hydrogen ($H_2$), helium, neon, argon, krypton, xenon, radon, ozone ($O_3$), carbon monoxide (CO), sulphur dioxide ($SO_2$), ammonia ($NH_3$), nitric oxide (NO), nitrous oxide ($N_2O$), nitrogen dioxide ($NO_2$), water vapour, hydrocarbons (functionalised or non-functionalised), or derivatives thereof.

7. The method of claim 1, wherein the sorbent further comprises a material selected from polymeric materials, membranes, resins, biomolecules, clays, ceramics, carbon, inorganic oxides, and a combination thereof.

8. A system for separating carbon dioxide from a mixture comprising:
a chamber having an inlet adapted to direct the mixture into the chamber; and
a sorbent comprising a metal organic framework (MOF) positioned within the chamber, wherein the MOF comprises:
a plurality of secondary building units (SBUs), each SBU comprising a repeating unit of one metal cation connected to another metal cation via a first moiety of an organic linker;
a layer of connected adjacent SBUs in which a second moiety of the organic linker in a first SBU is connected to a metal cation of an adjacent SBU,
wherein adjacent layers are connected to each other via linker-to-linker bonding interactions;
and wherein each metal ion is selected from cobalt(II) ions, manganese(II) ions and nickel(II) ions, the organic linker is 5-aminoisophthalate, the first moiety is a carboxylate group and the second moiety is an amino group.

9. The system of claim 8, wherein the sorbent further comprises polymeric materials, membranes, resins, biomolecules, clays, ceramics, carbon, inorganic oxides, and a combination thereof.

10. The system of claim 8, wherein the sorbent is positioned in an adsorption column.

11. The system of claim 8, wherein the sorbent is positioned on a fixed bed.

12. The system of claim 8, further comprising a pressure swing system for varying the pressure in the chamber.

13. The system of claim 8, further comprising a temperature swing system for varying the temperature in the chamber.

\* \* \* \* \*